(12) United States Patent
Yu et al.

(10) Patent No.: US 12,231,553 B2
(45) Date of Patent: Feb. 18, 2025

(54) KEY MANAGEMENT DEVICE, QUANTUM CRYPTOGRAPHY COMMUNICATION SYSTEM, AND COMPUTER PROGRAM PRODUCT

(71) Applicant: KABUSHIKI KAISHA TOSHIBA, Tokyo (JP)

(72) Inventors: Yu Yu, Kawasaki Kanagawa (JP); Yasuhiro Katsube, Yokohama Kanagawa (JP); Yoshimichi Tanizawa, Yokohama Kanagawa (JP); Ririka Takahashi, Tokyo (JP); Yasuhiro Fujiyoshi, Tokorozawa Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 215 days.

(21) Appl. No.: 17/898,902

(22) Filed: Aug. 30, 2022

(65) Prior Publication Data

US 2023/0299952 A1    Sep. 21, 2023

(30) Foreign Application Priority Data

Mar. 17, 2022    (JP) ................................ 2022-042596

(51) Int. Cl.
 H04L 9/08    (2006.01)
(52) U.S. Cl.
 CPC .................................. H04L 9/0855 (2013.01)
(58) Field of Classification Search
 None
 See application file for complete search history.

(56) References Cited

U.S. PATENT DOCUMENTS 7,392,378 B1    6/2008  Elliott
10,404,718 B2 *   9/2019  Huth ..................... H04L 9/3278
(Continued)

FOREIGN PATENT DOCUMENTS

JP    2016-213544 A    12/2016
JP    2017-92987 A    5/2017
JP    6426477 B2    11/2018

OTHER PUBLICATIONS

Y. Rekhter et al., "A Border Gateway Protocol 4 (BGP-4)," IETF RFC-4271, 104 pages (2006).
(Continued)

*Primary Examiner* — Trang T Doan
(74) *Attorney, Agent, or Firm* — Finnegan, Henderson, Farabow, Garrett & Dunner, LLP

(57) ABSTRACT

A key management device according to an embodiment is a key management device managing an application key for encrypting a communication in an application network including a plurality of applications. The key management device includes a hardware processor configured to function as a collection unit, a calculation unit, a determination unit, and a communication unit. The collection unit collects, using quantum key distribution (QKD), resource information indicating a resource of a link for which a link key is generated. The calculation unit calculates metric for a key relay route including the link on the basis of the resource information. The determination unit determines a key relay route from among a plurality of key relay routes on the basis of the metric. The communication unit uses the key relay route determined by the determination unit to send, to a destination, an application key encrypted with the link key.

12 Claims, 16 Drawing Sheets

(56) References Cited

U.S. PATENT DOCUMENTS

| | | | |
|---|---|---|---|
| 10,581,600 B2* | 3/2020 | Fu | H04L 9/0858 |
| 11,936,636 B2* | 3/2024 | Tanaka | H04L 45/00 |
| 12,028,450 B2* | 7/2024 | Su | H04L 9/08 |
| 2014/0023192 A1* | 1/2014 | Tanizawa | H04L 9/0827 |
| | | | 380/44 |
| 2016/0197723 A1* | 7/2016 | Takahashi | G06F 11/0709 |
| | | | 380/255 |

OTHER PUBLICATIONS

Ririka Takahashi et al., "A Routing Protocol for Secure Key Exchange in Quantum Key Distribution Networks", Information Processing Society of Japan Forum on Inf. Tech., vol. 12, No. 4, pp. 309-310 (2013).

Japan Patent Office, Office Action in JP App. No. 2022-042596, 2 pages, and machine translation, 3 pages (Nov. 26, 2024).

* cited by examiner

○ : KM

NUMBER: COST

----▶ KEY RELAY ROUTE A: BOTTLENECK (3), NUMBER OF HOPS (2)
———▶ KEY RELAY ROUTE B: BOTTLENECK (5), NUMBER OF HOPS (3)
······▶ KEY RELAY ROUTE C: BOTTLENECK (6), NUMBER OF HOPS (4)

KEY MANAGEMENT DEVICE, QUANTUM CRYPTOGRAPHY COMMUNICATION SYSTEM, AND COMPUTER PROGRAM PRODUCT

CROSS-REFERENCE TO RELATED APPLICATIONS

This application is based upon and claims the benefit of priority from Japanese Patent Application No. 2022-042596, filed on Mar. 17, 2022; the entire contents of which are incorporated herein by reference.

FIELD

Embodiments described herein relate generally to a key management device, a quantum cryptography communication system, and a computer program product.

BACKGROUND

Quantum key distribution (QKD) involves key relay route determination for sharing an application key between key management devices (KMs: key managers) in a key sharing network, that is, transferring of the application key through the plurality of KMs is performed. In a large-scale key sharing network, it is a general practice that the key sharing network is divided into a plurality of domains in order to efficiently manage the key sharing network and easily manage the key sharing network. However, in the conventional technologies, it is difficult to determine, in a QKD network, an optimal key relay route for sharing an application key.

DETAILED DESCRIPTION

Hereinafter, embodiments of a key management device, a quantum cryptography communication system, and a computer program product are detailed with reference to the accompanying drawings.

Example of Configuration of Quantum Cryptography Communication System

Figure 1:
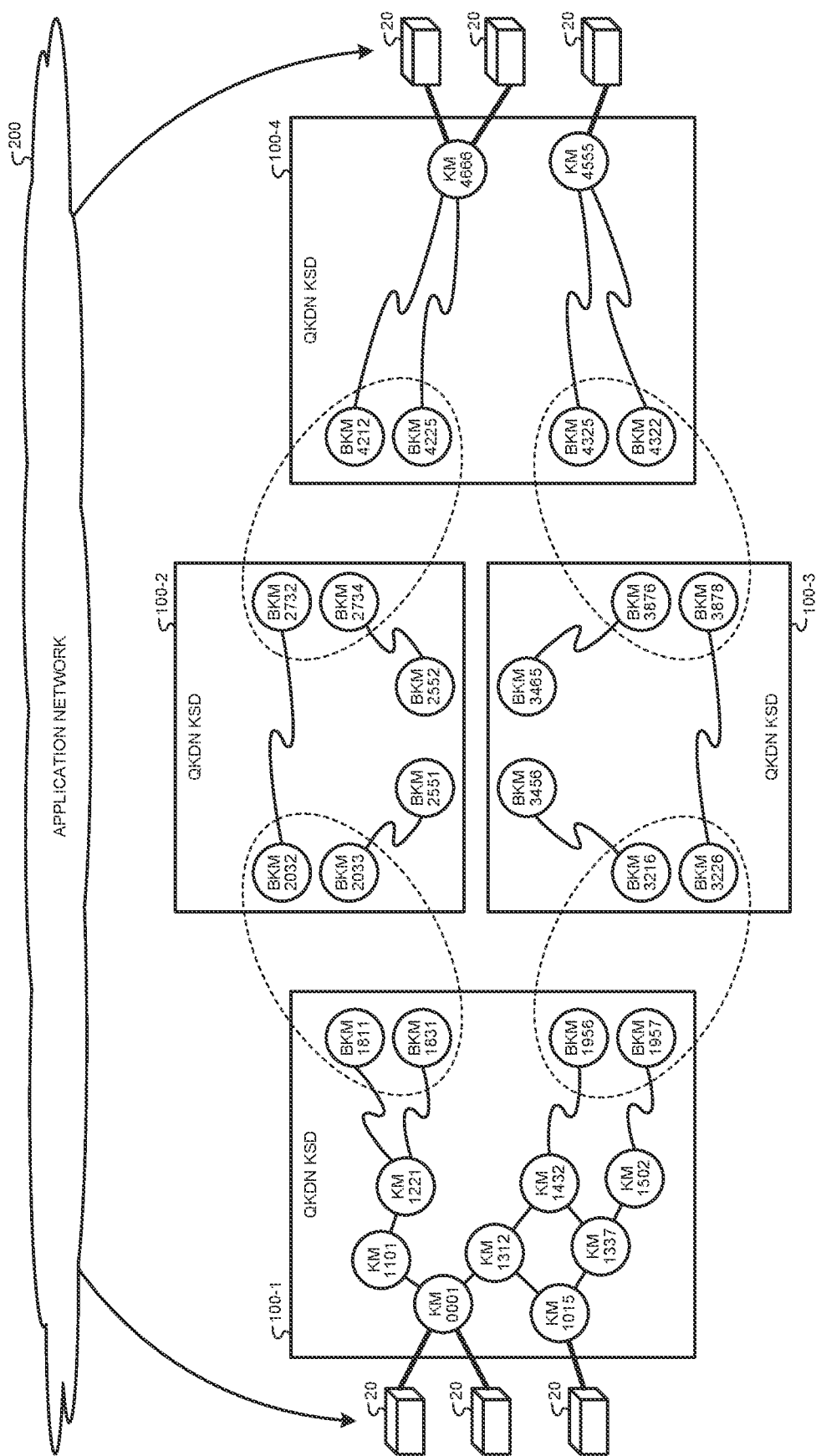
FIG. 1 is a diagram illustrating an example of a configuration of a quantum cryptography communication system according to an embodiment.

FIG. 1 is a diagram illustrating an example of a configuration of a quantum cryptography communication system according to an embodiment. The quantum cryptography communication system in FIG. 1 includes, as a multi-domain key sharing network, a plurality of QKD network key sharing domains (QKDN KSDs: quantum key distribution network key sharing domains) 100-1 to 100-4.

A plurality of key management devices (KMs) is communicably connected to each other by links to form the QKDN KSDs 100-1 to 100-4. Four-digit numbers given to the KMs in FIG. 1 indicate identification numbers for identifying the individual KMs. Further, a BKM indicates a KM at a boundary with an adjacent domain.

The plurality of networked KMs has a function to generate and share a random number between the KMs connected by a link, and a function to use the generated and shared random number as an encryption key (hereinafter, referred to as a "link key") to perform cryptography communication on the link.

In the example of FIG. 1, the function to generate and share a random number (link key) between the KMs connected by a link is implemented by a technology called quantum cryptography or quantum key distribution (QKD).

Further, some of the KMs have a function to generate an encryption key (hereinafter, referred to as an "application key") which is a random number independent of a random number (link key) generated between links, and a function to transmit the application key to another KM via a link.

An application 20 connected to each of the QKDN KSDs 100-1 to 100-4 has a function to acquire an application key from the KMs, use the application key as an encryption key, and perform cryptography communication with an application 20 as a communication destination. The cryptography communication at this time may be performed via an application network 200 different from that of the QKDN KSDs 100-1 to 100-4. The application network 200 may be, for example, the Internet or the like.

For example, the KM and the application 20 are implemented by one terminal. Alternatively, for example, the KM and the application 20 may be configured as separate terminals, and the application key may be transmitted and received between both the terminals. FIG. 1 illustrates an example of a case where the KM and the application 20 are configured as separate terminals.

Incidentally, the application 20 requesting the application key may be any application. Further, the number of KMs, the number of key sharing domains, and the number of applications 20 are not limited to the example of FIG. 1.

In each of the QKDN KSDs 100-1 to 100-4 is, for example, the number of KMs and the number of links between the KMs are limited to a certain limit value (1000, for example). In the example of FIG. 1, the KMs in the domain are represented separately as a general KM and a BKM at a boundary of the domain.

In the example of FIG. 1, the BKMs between the domains (BKM 1811, BKM 1831, BKM 2032, and BKM 2033, for example) are located in a physically identical trusted node (hereinafter referred to as a "site"). The BKMs in the same site basically share information not by quantum cryptography communication but by another method such as a local LAN connection. In FIG. 1, the links between the BKMs in the same site are omitted in order to distinguish from the links for the quantum cryptography communication.

In order to improve the reliability, the number of BKM links between the domains is basically one or more. For example, as illustrated in FIG. 1, there are two BKM links between the individual domains. On the other hand, in terms of cost saving, it is also possible to have only one BKM between the domains. In this case, information on a plurality of adjacent domains may be stored on one BKM.

Among the plurality of KMs, the BKM shares and stores information on a key sharing domain to which the BKM itself belongs and information on an adjacent key sharing domain. An adjacent BKM shares information in a method other than the QKD. Further, the information stored in the BKM is given a sequence number in time order, and the information is updated on the basis of the sequence number.

Examples of the information stored in the BKM include route information and resource information. The route information is information on routing protocol performed as background processing. The resource information is information used in processing for determining a key relay route through which the application key is transferred to a destination KM.

As protocol (routing protocol) for determining a route (key relay route) for sharing a quantum encryption key by the quantum key distribution in the QKDN KSDs 100, communication protocol for interior gateway protocol (IGP) is used. For example, open shortest path fast (OSPF) is used as the communication protocol. The OSPF uses a distance (a sum of costs of the links included in each key relay route) as metric for routing (route control).

As protocol (routing protocol) for determining a route (key relay route) for sharing a quantum encryption key by the quantum key distribution between the QKDN KSDs 100, communication protocol for exterior gateway protocol (EGP) is used. For example, border gateway protocol (BGP) is used as the communication protocol. The BGP is classified as path vector routing protocol and does not use technical metric.

Each KM in the key sharing network (QKDN KSDs 100-1 to 100-4) of the quantum cryptography communication system shares an application key. The KM consumes the link key when encrypting and exchanging the application key with the link key. This is because the KM uses the link key on a one-time pad, that is, the KM discards the link key once used. Therefore, the application key cannot be exchanged and relayed faster than a rate at which the amount of shared link keys or the link key is shared. In a case where the application key is exchanged via the plurality of KMs, the rate at which the application key is shared is limited to a link with the smallest amount of link keys or to a link with the lowest rate at which the link key is shared. The throughput of cryptography communication in the quantum cryptography communication system is constrained by a bottleneck in such a link. Alternatively, it is no longer possible to share the application key in a link with the link key exhausted. In the quantum cryptography communication system, it is desirable to share the application key by selecting a route with the best possible bottleneck.

On the other hand, when attention is paid to the consumption of the link key of the entire quantum cryptography communication system, it can be said that the more links a route goes through, the more link keys are consumed. Since the link key is used for sharing the application key, the link key is a system resource that determines the throughput of the application 20 to some extent. It is therefore desirable that the system as a whole has fewer links to go through and less consumption of the link key.

In a large-scale key sharing network, it is common that the key sharing network is divided into a plurality of domains (in the example of FIG. 1, QKDN KSDs 100-1 to 100-4) in order to efficiently manage the key sharing network and easily manage the key sharing network. However, the domains are not limited to the same standard, the same scale, and the same quantum protocol. For example, as the division type, in a case where an upper limit is set on the number of KMs or the number of links in the domain, many KMs in the domain have less key relay route information, which reduces the processing time. However, in a case where the key is shared with a KM outside the domain, it is desirable to determine a key relay route between the domains via a specific KM.

As described above, in the quantum cryptography communication system, considering the link key as a constraint resource (key resource) in the system, it is desirable to efficiently determine a key relay route in the domain and between the domains while avoiding the consumption and exhaustion of the key.

In view of this, the quantum cryptography communication system according to the present embodiment determines a key relay route for efficiently sharing an application key with the consumption of a link key reduced as much as possible. According to the quantum cryptography communication system according to the present embodiment, it is possible to reduce the consumption of the link key in the entire system while avoiding the exhaustion of the link key in a specific KM and maintaining the throughput of the application key sharing.

Specifically, the quantum cryptography communication system according to the present embodiment uses, as a part of the routing protocol, an algorithm for calculating resource information indicating a resource of an encryption key that can be provided to an application. Thereby, the best key relay route can be determined because metric for determination of the key relay route is based on a resource bottleneck (value indicating the bottleneck). The quantum cryptography communication system according to the present embodiment further uses the number of hops as the metric. This enables selection of a route with the consumption of the link key reduced. It is also conceivable to add the number of hops as the metric after the routing protocol is implemented.

Incidentally, the value indicating the bottleneck is, for example, a value of a resource of a potential bottleneck part. As described later, for example, the minimum value of the cost (resource) of each link included in the key relay route is the value indicating the bottleneck. Hereinafter, the value indicating the bottleneck may be simply referred to as a bottleneck.

Example of Functional Configuration

Figure 2:
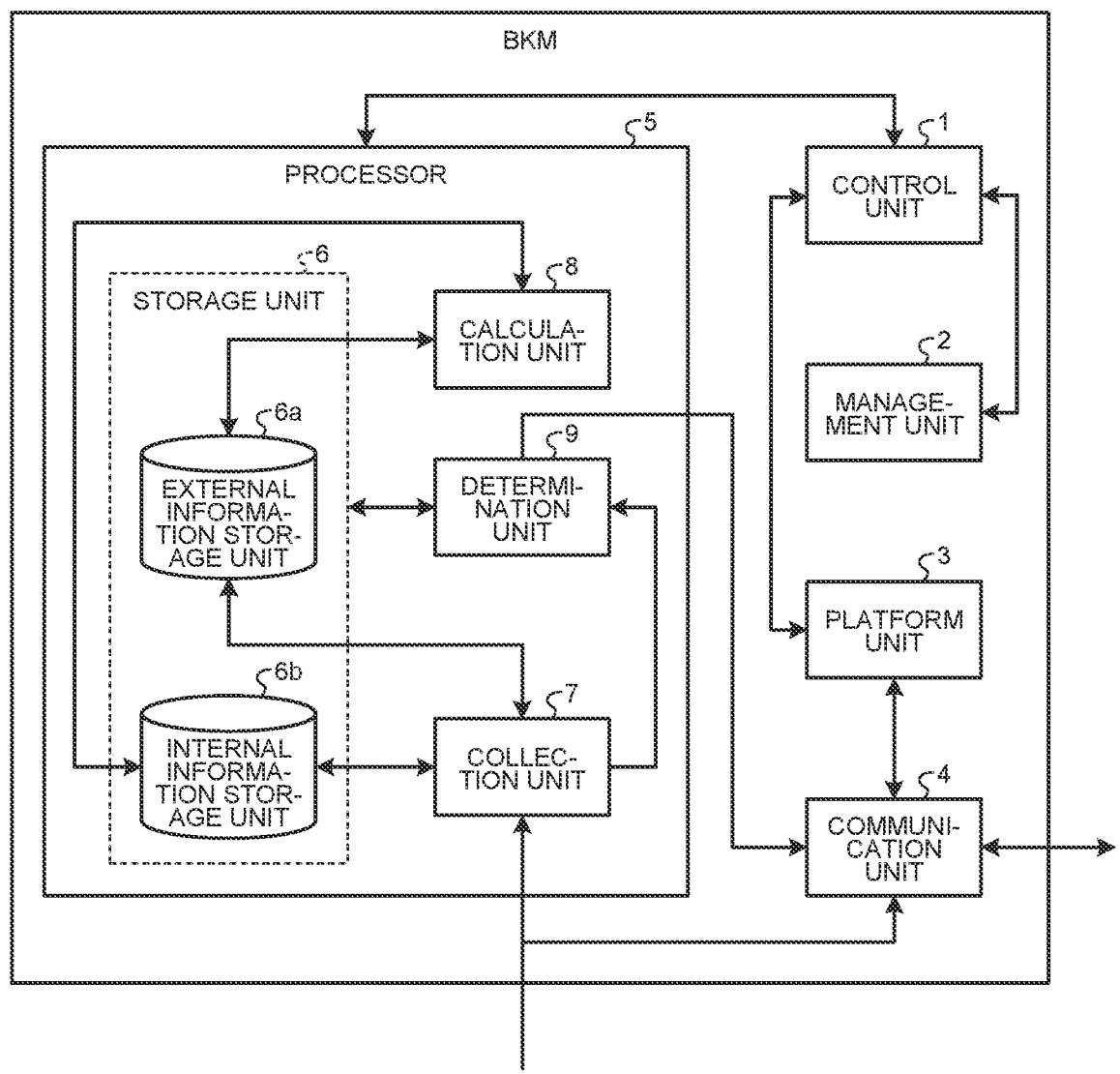
FIG. 2 is a diagram illustrating an example of a functional configuration of a BKM according to an embodiment.

FIG. 2 is a diagram illustrating an example of a functional configuration of the BKM according to the embodiment. The BKM of the embodiment includes a control unit 1, a management unit 2, a platform unit 3, a communication unit 4, and a processor 5.

The control unit 1 controls each processing performed in the BKM. For example, the control unit 1 is responsible for activating each functional unit.

The management unit 2 manages resources such as a key generation speed for a link to which the BKM is connected and an amount of key held which is used in the link.

The platform unit 3 provides an operating system function, a basic network function, a security function, and the like necessary for managing and operating the functions of the BKM.

The communication unit 4 communicates with another connected KM (BKM). The communication unit 4 uses the quantum cryptography to generate and share a random number with a KM (BKM) connected by a link, and manages the generated random number as the link key. Further, the communication unit 4 is used by another functional unit for data communication with another KM (BKM) connected by the link. Examples of data exchanged with another KM via the communication unit include data on an application key. The pieces of data are usually exchanged through cryptographic communication using the link key managed by the KM.

The processor 5 includes a storage unit 6, a collection unit 7, a calculation unit 8, and a determination unit 9.

The storage unit 6 includes an external information storage unit 6a and an internal information storage unit 6b. The external information storage unit 6a stores external information indicating information on a domain to which the BKM does not belong. The internal information storage unit 6b stores internal information indicating information on the domain to which the BKM belongs. Note that the external information storage unit 6a and the internal information storage unit 6b may be implemented by one storage unit 6 instead of being distinguished from each other.

Information stored in the storage unit 6 is various types of information such as a route table, a key relay route table, and key relay route attribute information (for example, link resource information or the like) of each KM (BKM). For example, the storage unit 6 stores, for each KM (BKM), key relay route attribute information (the key generation speed, the amount of key held, and QBER, for example) acquired from the KM (BKM).

The collection unit 7 acquires, from another KM (BKM), resource information of a link which can be provided by the KM (BKM) and route information. For example, the collection unit 7 also collects, through the communication unit 4, key relay route attribute information that is shared by a KM (BKM) of another domain. For example, the collection unit 7 collects resource information stored in the internal information storage unit 6b of another KM (BKM) belonging to the QKD network, and stores the resource information in the external information storage unit 6a. In addition, for example, the collection unit 7 dynamically collects information on the individual links.

The calculation unit 8 calculates metric on the basis of at least one of the bottleneck and the number of hops. The calculation unit 8 also calculates a state on the basis of the QBER. The calculation method is detailed later.

The determination unit 9 determines, on the basis of the metric, one key relay route having a state within a threshold (key relay route with the best metric) from a plurality of key relay route candidates reaching another KM (BKM).

The BKM has a function, in addition to the function of a general KM, to share route information with another domain (BGP, for example) and has a configuration (the external information storage unit 6a, for example). Therefore, a general KM other than the BKM does not necessarily include the external information storage unit 6a. Since the configuration of the KM of the embodiment is similar to that of the BKM except for the external information storage unit 6a, the description thereof is omitted. Hereinafter, in a case where the KM and the BKM are not distinguished from each other, they may be simply referred to as a KM.

Each of the units described above (the control unit 1, the management unit 2, the platform unit 3, the communication unit 4, the collection unit 7, the calculation unit 8, and the determination unit 9) may be implemented by causing a control device such as a central processing unit (CPU) to execute a program, that is, may be implemented by software, may be implemented by hardware such as an integrated circuit (IC), or may be implemented by using software and hardware in combination. Further, the storage unit 6 can be configured by any storage medium generally used, such as a hard disk drive (HDD), an optical disk, a memory card, and a random access memory (RAM).

Application Key Sharing Processing

An example of the application key sharing processing in the QKDN KSDs 100-1 to 100-4 is described. As the entire processing, first, the communication unit 4 of the KM generates a link key with an adjacent KM. Next, the processor 5 of each KM determines a key relay route for sharing the application key with an arbitrary KM. Then, the communication unit 4 of each KM shares (transfers) the application key to the destination KM while repeating encryption and decryption using the link key in each link according to the route determined.

Next, the processing for determining the key relay route is detailed. The communication units 4 of the KMs constituting the QKDN KSDs 100-1 to 100-4 exchange available resource information and route information with each other in the domain. Each KM calculates a resource bottleneck and the number of hops for a key relay route for sharing the application key with another KM. The storage unit 6 of each KM records the QBER at the time of sharing the link key.

In a case where the destination KM is in the domain, the determination unit 9 of each KM uses the resource bottleneck and the number of hops as the metric, and uses an algorithm described below to determine a key relay route that avoids key exhaustion of a link in which the key generation speed is slow and the amount of key held is small, and at the same time, reduces the key consumption in the domain. The BKM at a boundary between the domains stores the key relay route information in the domain in the internal information storage unit 6b.

Note that avoiding the bottleneck and reducing the number of hops are metric different from each other, and there may be some variations depending on the order and weighting for evaluation of the same. The determination unit 9 of the KM determines a key relay route that avoids the exhaustion of a link key of a certain link and reduces the key consumption in the domain by, for example, the following method (A) or (B).

(A) For key relay routes with the same metric [resource bottleneck], key relay route determination is performed in consideration of the metric [the number of hops].

(B) Key relay route determination is performed using single metric considering both the bottleneck and the number of hops.

In a case where a specific destination KM in the application key sharing is not present in the domain to which a source KM belongs, the communication unit 4 of the source KM requests key relay route information to the destination from each BKM in the domain to which the source KM belongs. In response to the request, each BKM between the domains requests key relay route information sharing of the specific destination KM from each adjacent domain BKM. In response to the request for the key relay route information to the specific destination KM, the adjacent BKM searches for the latest key relay route information stored in the internal information storage unit 6b of the subject adjacent BKM. In a case where the latest key relay route information is found in the internal information storage unit 6b, resource information regarding the key relay route is sent to the requesting BKM. In a case where no latest key relay route information is found in the internal information storage unit 6b of the adjacent BKM, the subject adjacent BKM continuously requests a BKM of the adjacent domain. Therefore, in a case where the latest key relay route information is found, resource information regarding a key relay route to the specific destination KM in the domain to which the BKM belongs and resource information regarding a key relay route of the domain to go through is sent to the requesting BKM. Further, it is possible to set an upper limit value of the number of domains to go through.

Incidentally, the key relay route information stored in the internal information storage unit 6b is updated from the sequence number. When requesting the key relay route information, the BKM shares the latest key relay route information. Further, resource information regarding the key relay route between the BKMs in each domain is stored in the external information storage unit 6a. It is of course possible that all the pieces of key relay route information are stored in the same storage unit 6. In the embodiment, the internal information storage unit 6b and the external information storage unit 6a are described separately for easy understanding of the processes inside and outside the domain.

Further, it is assumed that a plurality of BKMs at a boundary between the domains is physically disposed at the same location (trusted node). Further, information sharing between the BKMs does not depend on a link used for key sharing.

In addition, in a case where an emergency occurs in which the QBER of a certain link in the QKDN KSDs 100-1 to 100-4 exceeds a specified threshold (it is determined that there is a high possibility of eavesdropping), the BKM is immediately notified. The determination unit 9 of the notified BKM does not use the key relay route including the link, and the BKM at a boundary between the domains immediately redetermines a new route from among candidate routes.

Further, it may be configured such that the determination processing of the routing protocol and the key relay route is performed again in response to the occurrence of major fluctuations in resources.

Note that, as an example of the metric, the resource bottleneck and the number of hops on the key relay route are adopted; however, other elements can also be used as the metric. In addition, the bottleneck is used as the first element of the metric, and the number of hops is evaluated as the next element of the metric; however, the order of evaluation thereof may be reversed. Specifically, the route determination processing may be performed on the basis of the number of hops on the key relay route as the metric, and the bottleneck may be evaluated in a case where the number of hops is equal.

Specifically, for example, the calculation unit 8 calculates first metric based on the bottleneck of the resource information of the plurality of links included in the key relay route and second metric inversely proportional to the number of hops. Then, in a case where there is a plurality of key relay routes having the same first metric, the determination unit 9 determines the key relay route further on the basis of the second metric. Alternatively, in a case where there is a plurality of key relay routes having the same second metric, the determination unit 9 determines the key relay route further on the basis of the first metric.

It is also possible to adjust the degree to which each of the resource bottleneck and the number of hops on the key relay route is reflected in the metric. The adjustment is possible, for example, by weighting the resource bottleneck and the number of hops on the key relay route and calculating the metric.

Considering the resource bottleneck relates to the avoidance characteristics with respect to the speed of sharing the application key (throughput) or the exhaustion of the link key on a link. In addition, considering the number of hops relates to the consumption of the key of the entire system. The metric should be selectively used according to the application to which the quantum cryptography communication system is applied.

In the present embodiment, the route information collection in the KM domain involves using OSPF which is existing routing protocol, and the route information collection between the KM domains involves using the existing routing protocol BGP; however, the use of another protocol is not excluded.

First, the data correlated with the links between each KM constituting the QKDN KSDs 100-1 to 100-4 and the adjacent KM is as follows. The data provided below is given a sequence number in time order and is updated from the sequence number.

Data correlated with link:
Cost (resource information): link key generation speed
Cost (resource information): amount of link key held
State (resource information): QBER
Data correlated with KM:
Database representing configuration in domain (link state database)
Confirmed information of shortest path tree to destination KM in domain
Confirmed information of shortest path tree to each BKM in domain
Bottleneck from source to destination KM in domain
Number of hops from source to destination KM in domain
Maximum QBER value from source to destination KM in domain
Bottleneck from source to each BKM
Number of hops from source to each BKM
Maximum QBER value from source to each BKM
Next hop The data correlated with the link is resource information. The resource information includes two types of costs (a link key generation speed and an amount of the link key held) and a link state (QBER).

The key generation speed represents a speed at which a link key is shared by performing quantum key distribution between adjacent KMs. The key generation speed varies for each link depending on the influence of the setting parameters of the KM connected to the link, the connection environment, and the like.

The amount of key held is an amount of keys that have not yet been used among keys shared by performing the quantum key distribution between the adjacent KMs. The amount of key held is accumulated (increased) by performing the quantum key distribution, and consumed (decreased) by using the link key in an application key relay between any source KM and a destination KM. Note that the cost is not limited thereto. For example, only the key generation speed or only the amount of key held may be used as the cost.

Next, in order to describe the data correlated with the KM, first, a key relay route determination method in the domain is described.

Example of Method for Determining Key Relay Route in Domain

Information necessary for determining a key relay route in the domain is collected by the following processing (1) to (4) using the OSPF which is existing routing protocol.

(1) In the OSPF, the KM issues a message called a link state update and shares, with another KM, information such as a state of a link to which the KM is connected, a network address of the link, and a cost. The link state includes information (route information) on how a certain KM is connected to another KM.

(2) Each KM that has received the link state update finds the network configuration in the domain on the basis of the information. Then, a table (link state database) representing the network configuration in the domain is constructed.

(3) Each KM uses the Dijkstra's algorithm from the database to calculate the shortest path tree in the domain in which the subject KM is the source, and creates a forwarding table.

(4) The internal information storage unit 6b stores forwarding table information from a certain KM to another KM in the domain and resource information.

The foregoing is the basic forwarding table determination method in the domain in the QKDN KSDs 100-1 to 100-4. The present embodiment mainly relates to (3) creation of the shortest path tree in the domain among the methods described above. The foregoing (1) (2) and (4) can be executed with processing similar to the conventional processing. However, as described later, information unique to the present embodiment is included in a part of the information shared by the procedure (1).

As described above, the data correlated with a KM is a link state database, confirmed information of the shortest path tree to a destination KM in a domain, confirmed information of a shortest path tree to each BKM in a domain, a bottleneck from a source to a destination KM in a domain, the number of hops from a source to a destination KM in a domain, a maximum QBER value from a source to a destination KM in a domain, a bottleneck from a source to each BKM, the number of hops from a source to each BKM, a maximum QBER value from a source to each BKM, and a next hop.

The link state database indicates a network configuration (connection relationship) in the domain, and is information used for each KM to calculate the shortest path.

Each piece of the confirmed information of the shortest path tree to the destination KM in the domain indicates whether or not the shortest path to the KM is confirmed for each destination KM in the domain. If the shortest path to the KM is not confirmed, the key relay route to the KM is only a candidate for the shortest path.

Each piece of the confirmed information of the shortest path tree to each BKM in the domain indicates whether or not the shortest path to the BKM is confirmed for each BKM in the domain. If the shortest route to the BKM is not confirmed, the key relay route to the BKM is only a candidate for the shortest path.

The bottleneck from the source to the destination KM in the domain indicates a bottleneck of the cost of the link for a case where the shortest path candidate to reach the destination KM is passed through.

The number of hops from the source to the destination KM in the domain indicates the number of hops for a case where the shortest path candidate to reach the destination KM is passed through.

The maximum QBER from the source to the destination KM in the domain indicates the maximum QBER value for a case where the shortest path candidate to reach the destination KM is passed through.

The bottleneck from the source to each BKM in the domain indicates a bottleneck of the cost of the link for a case where the shortest path candidate to reach each BKM is passed through.

The number of hops from the source to each BKM indicates the number of hops for a case where the shortest path candidate to reach each BKM is passed through.

The maximum QBER from the source to each BKM indicates the maximum QBER value for a case where the shortest path candidate to reach each BKM is passed through.

The next hop indicates a next hop that is a candidate for the shortest path.

Each KM has the link state database, the confirmed information as the shortest key relay route tree in the domain, the cost and state (resource information) of each link from the source KM to each of the other KMs, the number of hops from the source to each of the other KMs, and the next hop. The cost of each link from the source to other KMs and the number of hops from the source to other KMs are held for each of the other KMs.

In the Dijkstra's algorithm in the OSPF, the metric is distance. On the other hand, in the key sharing routing protocol of the present embodiment, the bottleneck in the key relay route is used for the calculation of the metric instead of the distance. The bottleneck is introduced as the metric in order to keep the key generation speed and the amount of key held between KMs sharing an application key equal to or greater than a certain value and to prevent a trouble from occurring in acquiring an amount of encryption keys required in the application network.

Example of Metric

Figure 3A:
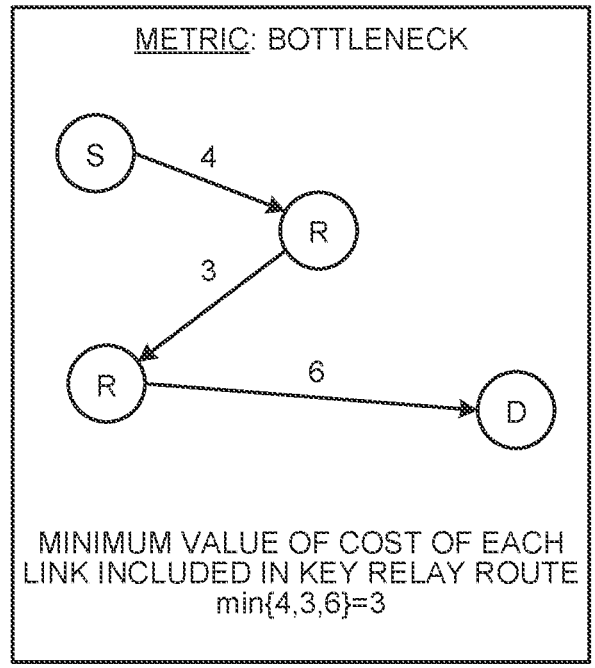
FIG. 3A is a diagram illustrating Example 1 of metric according to an embodiment.

FIG. 3A is a diagram illustrating Example 1 of the metric according to the embodiment. FIG. 3A illustrates a case where the bottleneck (cost) is used for the metric. The bottleneck (cost) is calculated on the basis of the resource information including at least one of the link key generation speed in each link and the amount of link key held in each link. The calculation unit 8 calculates the metric on the basis of the resource information.

For example, the bottleneck (cost) is calculated by the following equation.

$$\text{Cost}_{link} = U_{key} + SKR \times t$$

Here, $U_{key}$ represents the amount of unused link keys (the remaining amount of keys) in each KM, SKR represents the link key generation speed of each KM, and t represents a reference time interval. The reference time interval (t) is set according to the actual situation. For example, in a case where $U_{key}$ is 1000 Mbits, SKR is 3 Mbits/sec, and t is 300 sec, $Cost_{link}$ is 1900 (1.9 Gbits).

In FIG. 3A, a numerical value given to each link represents a cost. The minimum value of the cost of each link included in the key relay route from the source (S) to the destination (D) via the relay (R) is the metric (bottleneck).

In the example of FIG. 3A, since the bottleneck is the minimum value of the cost of each link included in the key relay route, min {4,3,6}=3. That is, the metric (bottleneck) of the key relay route in FIG. 3A is 3.

Figure 3B:
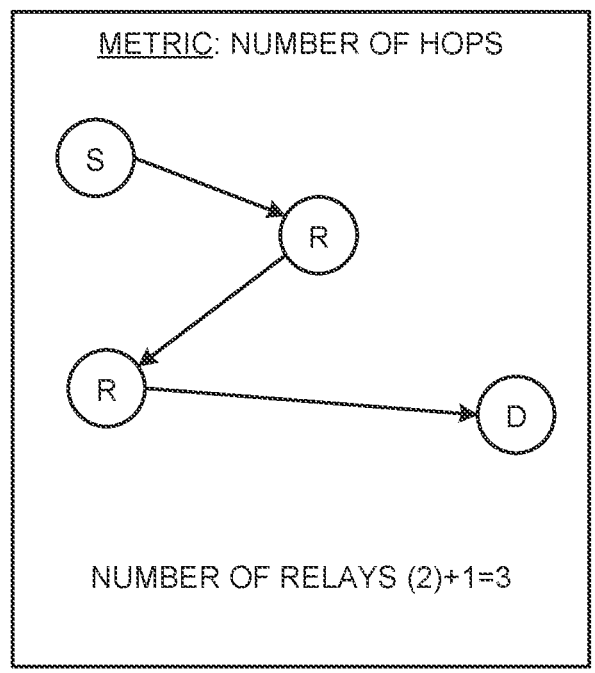
FIG. 3B is a diagram illustrating Example 2 of metric according to an embodiment.

FIG. 3B is a diagram illustrating Example 2 of the metric according to the embodiment. FIG. 3B illustrates a case where the number of hops is used for the metric. The number of hops is a value of the number of relay KMs+1. The value of the number of relay KMs included in the key relay route from the source (S) to the destination (D) via the relay (R)+1 is the metric (the number of hops).

In the example of FIG. 3B, since the number of hops is the number of relay KMs+1, the number of hops is the number of relays (2) included in the key relay route+1=3. That is, the metric (the number of hops) of the key relay route in FIG. 3B is 3.

Example of State of Key Relay Route

Figure 3C:
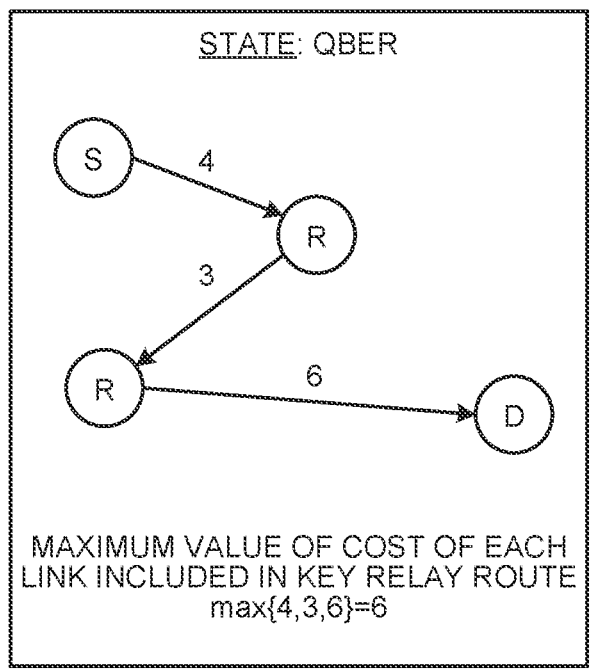
FIG. 3C is a diagram illustrating an example of a state of a key relay route according to an embodiment.

FIG. 3C is a diagram illustrating an example of a state of the key relay route according to the embodiment. FIG. 3C illustrates a case where the QBER is used for the state of the key relay route. A numerical value given to the link represents a QBER value. The maximum value of the QBER of each link included in the key relay route from the source (S) to the destination (D) via the relay (R) is the state.

In the example of FIG. 3C, since the QBER is the maximum value of the state of each link included in the key relay route, min {4,3,6}=6. That is, the state of the key relay route is 6.

Example of Determination Method of Key Relay Route

Figure 4:
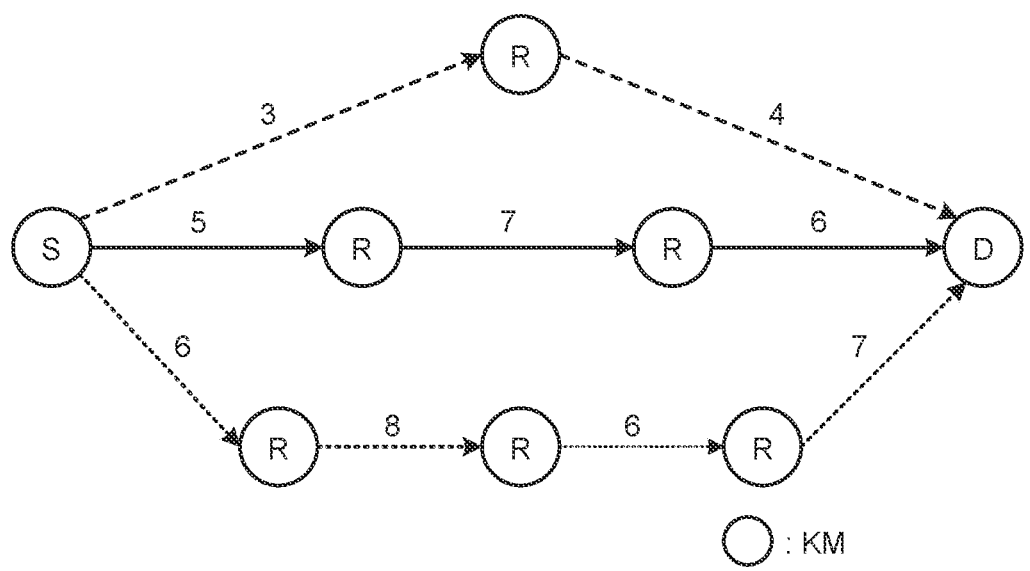
FIG. 4 is an explanatory diagram of an example of a method for determining a key relay route according to an embodiment.

FIG. 4 is an explanatory diagram of an example of a method for determining the key relay route according to the embodiment. FIG. 4 illustrates a method for selecting a key relay route (path) on the basis of the metric. In FIG. 4, "S" represents a source KM, "D" represents a destination KM, and "R" represents a relay KM for sharing an application key. In addition, a number assigned to a link represents the bottleneck (cost) of the link. The key relay route A has a bottleneck of 3 and the number of hops of 2. The key relay route B has a bottleneck of 5 and the number of hops of 3. The key relay route C has a bottleneck of 6 and the number of hops of 4.

An example of a metric calculation method for a case where the metric is calculated from the bottleneck and the number of hops is described below.

Method 1: The determination unit 9 keeps the bottleneck and the number of hops in separate areas. The determination unit 9 then gives priority to the bottleneck, and in a case where the bottlenecks are equal, the determination unit 9 compares the number of hops to determine a route with a smaller number of hops as an optimal key relay route.

Method 2: The determination unit 9 keeps the bottleneck and the number of hops in separate areas. The determination unit 9 then gives priority to the number of hops, and in a case where the number of hops is equal, the determination unit 9 compares the bottleneck to determine a route with a larger bottleneck as an optimal key relay route.

Method 3: The determination unit 9 determines an optimal key relay route by calculating metric (Metric) including a bottleneck (BN) and the number of hops (Hops) using a calculation formula.

The calculation formula is calculated by, for example, the following equation.

$$\text{Metric} = \delta \times BN + (1-\delta) \times (1/\text{Hops})$$

Here, $\delta$ is a coefficient smaller than 1.

On the other hand, in a case where the metric is only the bottleneck, the key relay route C is an optimal key relay route. In a case where the metric is only the number of hops, the key relay route A is an optimal key relay route. By setting the coefficients of the calculation formula above, it is possible to realize a case where the metric is only one of the bottleneck and the number of hops. For example, in a case where the metric is set to be only the bottleneck, $\delta=1$ is set. Alternatively, in a case where the metric is set to be only the number of hops, $\delta=0$ is set.

An example in which $\delta=0.5$ is set and the metric is calculated according to Method 3 above is described using the example of FIG. 4.

The metric of the key relay route A is Metric=$0.5 \times 3 + (1-0.5) \times (1/2) = 1.75$. The metric of the key relay route B is Metric=$0.5 \times 5 + (1-0.5) \times (1/3) = 2.67$. The metric of the key relay route C is Metric=$0.5 \times 6 + (1-0.5) \times (1/4) = 3.125$.

In Method 1, the bottlenecks and the number of hops to reach to each KM are respectively held, and the number of hops is compared only in a case where the bottlenecks are equal. In Method 2, the bottlenecks and the number of hops to reach to each KM are respectively held, and the bottlenecks are compared only in a case where the number of hops is equal. In Method 3, a calculation formula representing the metric is prepared in advance, and the metric is calculated from the bottlenecks and the number of hops to reach to each KM.

Note that the calculation formula for the metric is an example, and the calculation formula is not limited thereto. For example, another formula may be used in which a result obtained by weighting the bottleneck and the number of hops and adding them together is used as the metric. In this case, coefficients (weights) for the bottleneck and the number of hops are arbitrary.

Figure 5:
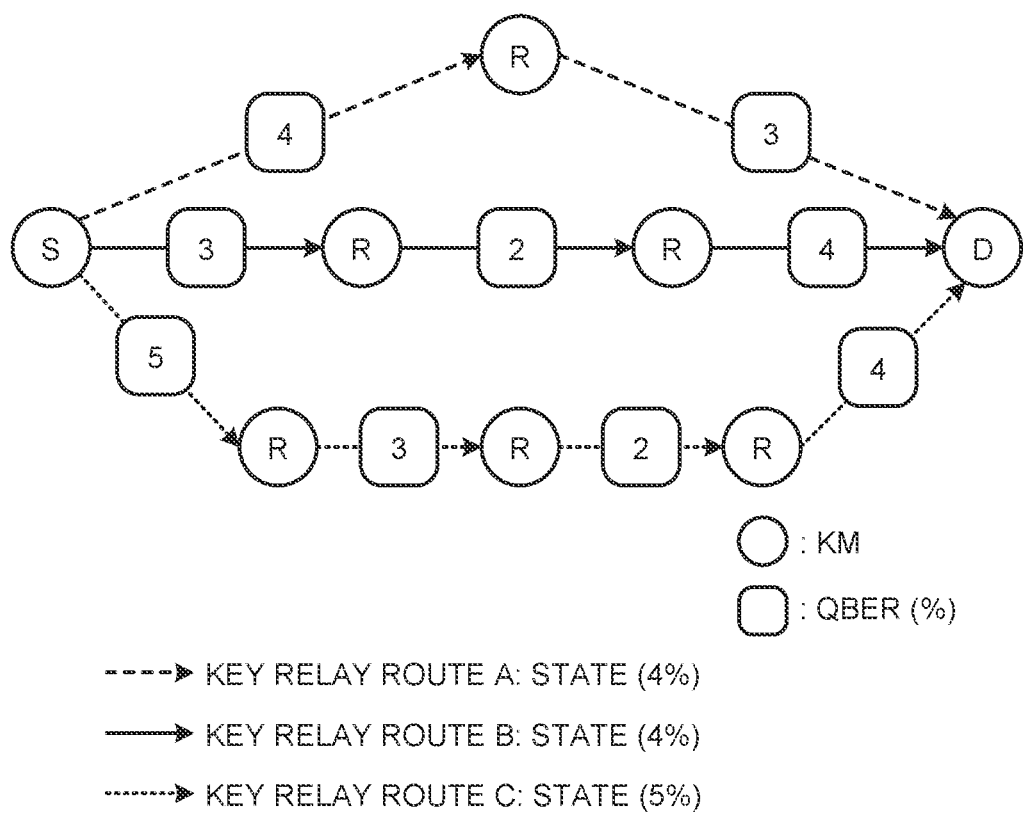
FIG. 5 is an explanatory diagram of an example of a method for determining a key relay route in further consideration of a state of a key relay route according to an embodiment.

FIG. 5 is an explanatory diagram of an example of a method for determining the key relay route in further consideration of a state of the key relay route according to the embodiment. The determination unit 9 further considers the QBER of the key relay route as the state in addition to the metric (bottleneck and the number of hops). As a result, in the key relay route determination in the domain, route selection with the key consumption reduced is possible, and a response at the anomaly occurrence can be made, so that route selection can be made efficiently.

In FIG. 5, "S" represents a source KM, "D" represents a destination KM, and "R" represents a relay KM for sharing an application key. In addition, a number assigned to a link represents a state of the link.

The state of the key relay route is the maximum value of the QBER of each link. As illustrated in FIG. 5, for example, the state of the key relay route A is 4%. The state of the key relay route B is 4%. The state of the key relay route C is 5%.

The state of the key relay route indicates stability and safety of the key relay route. The state of the key relay route is one element to determine the key relay route. The same threshold is set for the state in each domain. In a case where the QBER value of a link exceeds the threshold, it is assumed that the link is very likely to be eavesdropped. In a case where the QBER value exceeds the threshold, the determination unit 9 determines that the key relay route including the link is unsafe, and determines a new key relay route while avoiding a link whose QBER value exceeds the threshold. The threshold is usually within 100%. For example, the threshold is set to 50%. Incidentally, in a case where the QBER of the avoided link returns to the threshold or less, the route including the link is again a candidate for the key relay route.

The example of FIG. 5 illustrates a case where the application key is relayed from the source KM (S) to the destination KM (D). A case where the key relay route C with the best metric is determined with reference to the method 3 is described. For example, it is assumed that a link having a QBER value of 5% of the key relay route C is eavesdropped and the QBER value rapidly increases to 55%. At this time, for example, in a case where detecting that the state of the key relay route C exceeds the threshold, R10 which is the relay KM feeds back to all of the KMs included in the key relay route C.

When receiving information that the state of a link of the key relay route C is anomaly, the source KM (S) avoids the key relay route C. Thereafter, the determination unit 9 of the source KM (S) performs again the processing for determining a key relay route in the domain, and determines the best key relay route that does not include the link as described above.

As a specific operation example of each unit, first, the collection unit 7 further collects state information dynamically indicating the state of the link. Next, the calculation unit 8 calculates the state information on the key relay route on the basis of the state information of the link included in the key relay route. Then, the determination unit 9 determines a key relay route on the basis of the metric from key relay routes whose state information on the key relay route is smaller than the threshold, and determines that a key relay route whose state information on the key relay route is equal to or larger than the threshold is an anomaly route.

Figure 6:
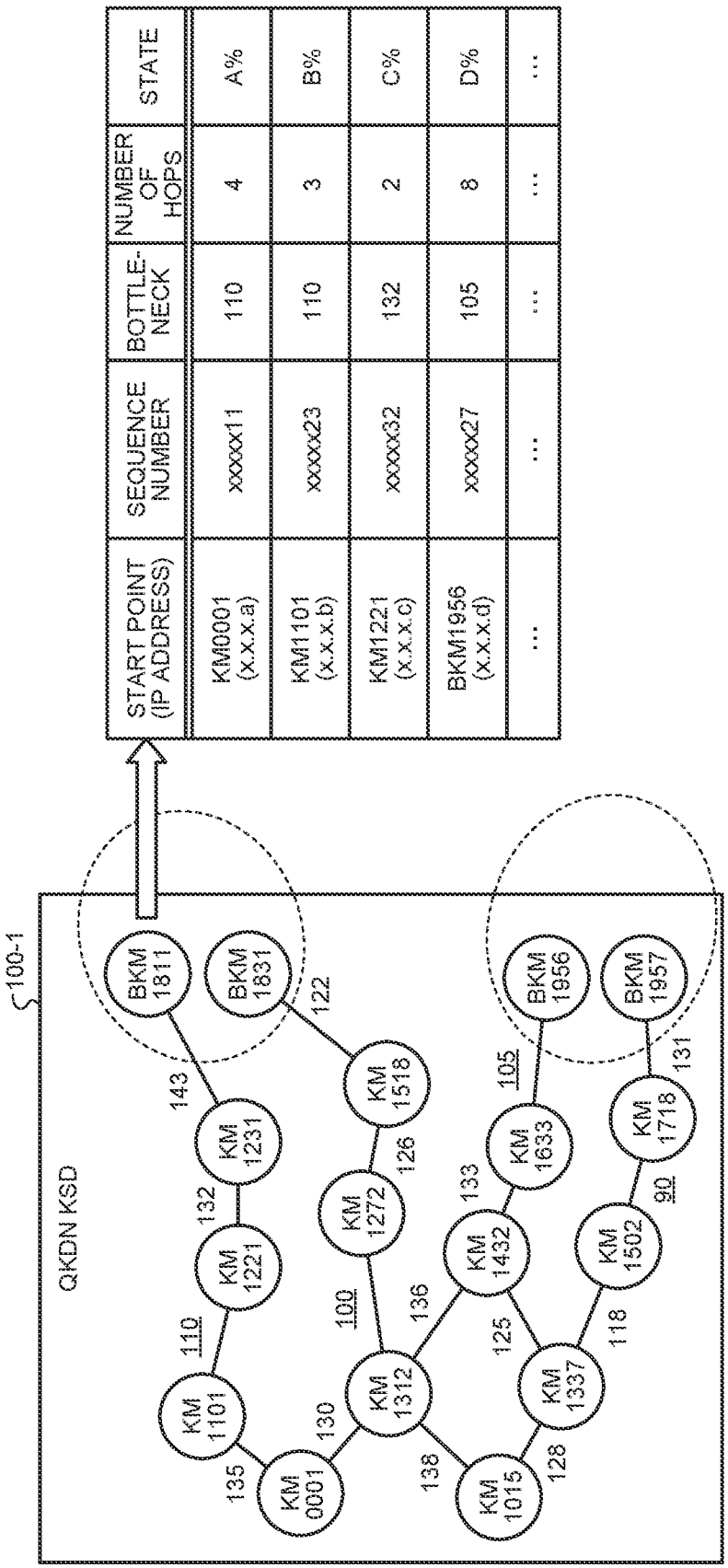
FIG. 6 is a diagram illustrating an example of key relay route attribute information stored in an internal information storage unit according to an embodiment.

Example of Key Relay Route Attribute Information Stored in Internal Information Storage Unit FIG. 6 is a diagram illustrating an example of the key relay route attribute information stored in the internal information storage unit 6b according to the embodiment. In the example of FIG. 6, the key relay route attribute information stored in the internal information storage unit 6b of the BKM 1811 at the boundary of the QKDN KSD 100-1 is described. The key relay route attribute information stored in the internal information storage unit 6b is information that is a candidate for the shortest path from each KM (including BKM) in the domain.

The collection unit 7 performs OSPF routing in the domain, collects the key relay route attribute information to create a table, and stores the table in the internal information storage unit 6b. The information collected by the collection unit 7 includes the metric information (the bottleneck and the number of hops), the state information (QBER), the host name of the source, and the value indicating the time of the information. The information collected by the collection unit 7 may further include other information related to the key relay route attribute information.

The key relay route attribute information illustrated in FIG. 6 includes a start point (IP address), a sequence number, a bottleneck, the number of hops, and a state. The start point (IP address) is a host name (IP address, for example) of the source. The sequence number is a value (sequence number in time order, for example) indicating the time of the information. The bottleneck is a bottleneck in the key relay route. The number of hops is the number of hops on the key relay route. The state is state information (QBER) on the key relay route.

The collection unit 7 collects the key relay route attribute information at predetermined time intervals, for example, and updates and discards the old key relay route attribute information on the basis of the sequence number. For example, in a case where the sequence number is a newer number (for example, the sequence number of the received key relay route attribute information is larger than the sequence number of the held key relay route attribute information), the key relay route attribute information that is a candidate for the shortest path is updated. Further, for example, in a case where the sequence number is an older number (for example, the sequence number of the received key relay route attribute information is smaller than the sequence number of the held key relay route attribute information), the received key relay route attribute information is discarded as it is.

Next, a key relay route determination method between domains is described.

Example of Method for Determining Key Relay Route Between Domains

Once a key relay route in the domain is available, a process of determining a key relay route between domains starts. The key relay route between the domains is collected using the BGP, which is existing routing protocol. The KM using the BGP is only BKMs at the boundary of the domain rather than all of the KMs. The BKM has a function, in addition to the function of a general KM, to share information with another domain and has a configuration to store shared information (the internal information storage unit 6b and the external information storage unit 6a, for example).

Example of BGP-Related Information

Figure 7:
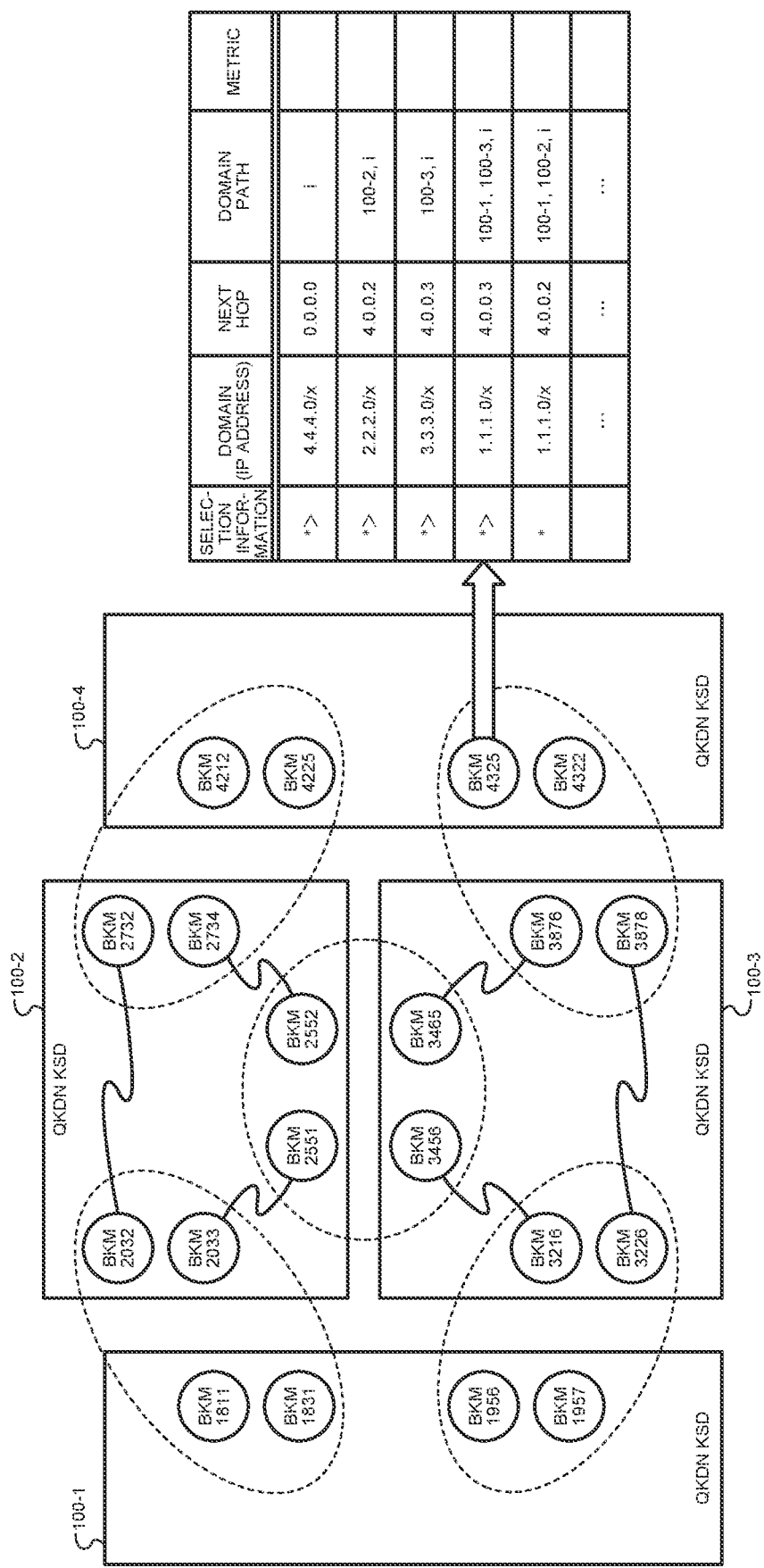
FIG. 7 is a diagram illustrating an example of BGP-related information according to an embodiment.

FIG. 7 is a diagram illustrating an example of the BGP-related information according to the embodiment. In the example of FIG. 7, the BGP-related information stored in the external information storage unit 6a of a BKM 4325 is described. The collection unit 7 executes BGP routing protocol, ascertains the network configuration of the domain to which the BKM 4325 belongs and the route information of the adjacent domain, and creates a route table regarding the BGP as the BGP-related information based on the route information.

The BGP-related information of the embodiment includes selection information, a domain (IP address), a next hop, a domain path, and metric. Note that the BGP-related information may further include other information related to the BGP-related information.

The selection information indicates a selection state of the key relay route (BGP route). In FIG. 7, ">" represents a route selected as the best key relay route. In FIG. 7, "*" represents that the key relay route is a valid route (selectable route).

The domain (IP address) indicates a prefix/mask length of the network of a destination domain. In the example of FIG. 7, "1.1.1.0/x" represents a prefix/mask length of the network of the QKDN KSD 100-1. In the example of FIG. 7, "2.2.2.0/x" represents a prefix/mask length of the network of the QKDN KSD 100-2. In the example of FIG. 7, "3.3.3.0/x" represents a prefix/mask length of the network of the QKDN KSD 100-3. In the example of FIG. 7, "4.4.4.0/x" represents a prefix/mask length of the network of the QKDN KSD 100-4.

The next hop is an IP address or a host name of the next hop.

The domain path indicates a key relay route to the destination domain. The numbers of passed domains are sequentially listed from the right end. Regarding the type of the route, there are internal BGP (IBGP) for the route in the domain and external BGP (EBGP) for the links from other BKMs outside the domain. The IBGP is represented by "i". The EBGP records the number of passed domains.

The metric indicates metric of the BGP. The metric is calculated on the basis of the key relay route attribute information. The calculation method is the same as the calculation method for the OSPF in the domain.

In the example of FIG. 7, for example, there are two domain paths from the QKDN KSD 100-4 to which the BKM 4325 belongs to the QKDN KSD 100. The first domain path is a domain path (100-1, 100-2, i) passing through the QKDN KSD 100-2. The second domain path is a domain path (100-1, 100-3, i) passing through the QKDN KSD 100-3.

The domain path (100-1, 100-2, i) given "*" is a valid route, but is not the best key relay route. The domain path (100-1, 100-3, i) given "*>" is the best key relay route.

Example of Method for Sharing Key Relay Route Attribute Information

Figure 8:
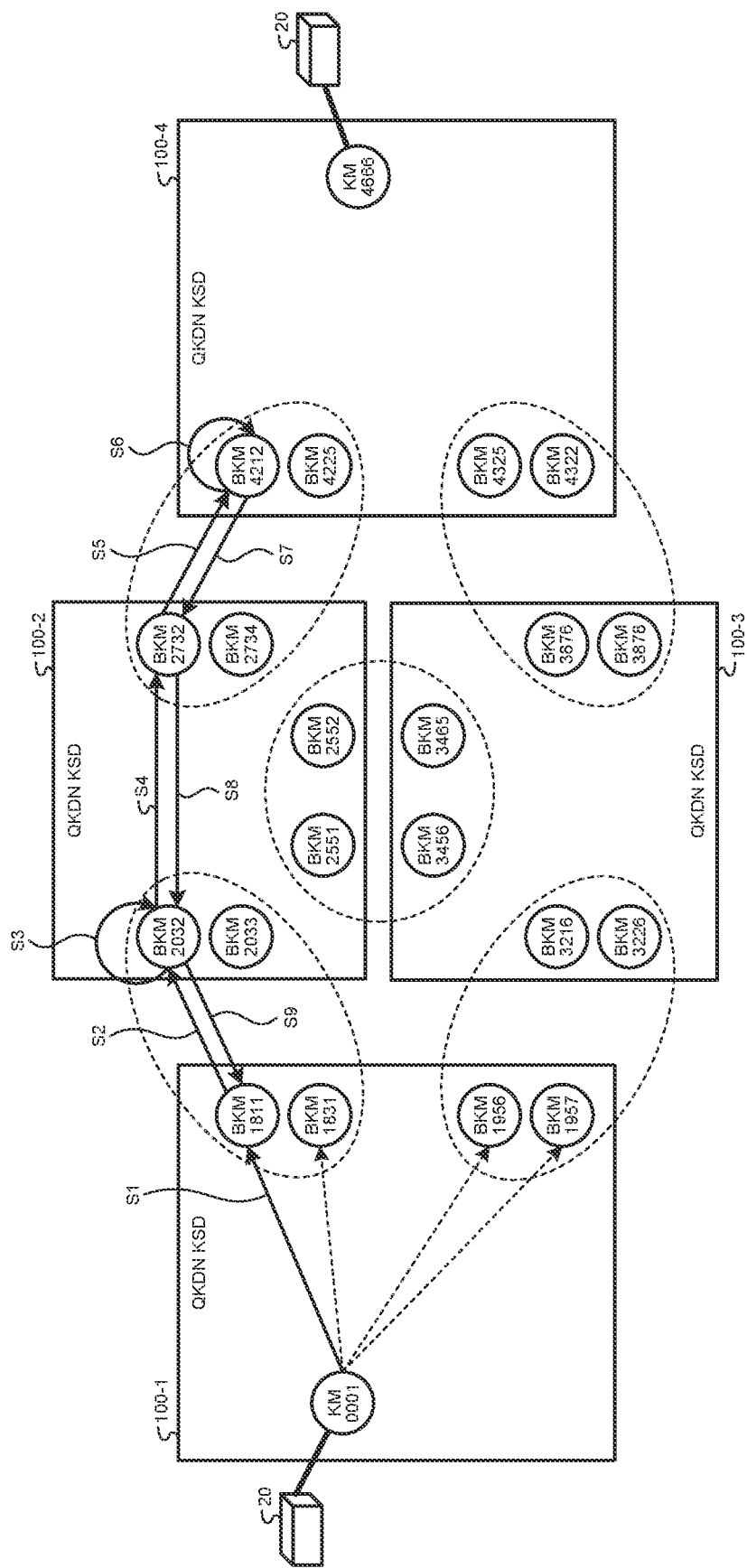
FIG. 8 is an explanatory diagram of an example of a method for sharing key relay route attribute information according to an embodiment.

Sharing of the key relay route attribute information in a BKM at a domain boundary is described. FIG. 8 is an explanatory diagram of an example of a method for sharing the key relay route attribute information according to the embodiment. FIG. 8 illustrates a basic sequence for sharing the key relay route attribute information from a source KM to a destination KM outside the domain.

The processing described in FIG. 8 is executed after each BKM executes the BGP routing protocol and ascertains the network configuration of the domain to which the subject BKM belongs and the information on a BKM of an adjacent domain.

First, in a case where a KM 0001 shares a key with a destination KM 4666 outside the domain, the collection unit 7 of the KM 0001 requests all of the BKMs in the QKDN KSD 100-1 to search for a route of a key relay route (Step S1).

Hereinafter, in the example of FIG. 8, a case where the BKM 1811 has accepted the request of Step S1 is described as an example.

Next, the BKM 1811 checks with the BKM 2032 of the adjacent QKDN KSD 100-2 whether the BKM 2032 has key relay route attribute information to the destination KM 4666 (Step S2). Next, the BKM 2032 refers to the internal information storage unit 6b and searches for the key relay route attribute information to the destination KM 4666 (Step S3).

If the key relay route attribute information to the destination KM 4666 is found in Step S3, then the BKM 2032 sends, to the BKM 1811, the key relay route attribute information to the destination KM 4666 and shares the key relay route attribute information to the destination KM 4666 with the BKM 1811 (Step S9).

If the key relay route attribute information to the destination KM 4666 is not found in Step S3, then the BKM 2032 requests the key relay route attribute information to the destination KM 4666 from a BKM 2732 adjacent to the QKDN KSD 100-4 (Step S4).

Next, the BKM 2732 checks with a BKM 4212 of the adjacent QKDN KSD 100-4 to check whether the BKM 4212 has key relay route attribute information to the destination KM 4666 (Step S5). Next, the BKM 4212 refers to the internal information storage unit 6b and searches for the key relay route attribute information to the destination KM 4666 (Step S6).

If the key relay route attribute information to the destination KM 4666 is found in Step S6, then the BKM 4212 sends, to the BKM 2732, the key relay route attribute information to the destination KM 4666 and shares the key relay route attribute information to the destination KM 4666 with the BKM 2732 (Step S7).

Next, the BKM 2732 sends, to the BKM 2032, the key relay route attribute information to the destination KM 4666 and shares the key relay route attribute information to the destination KM 4666 with the BKM 2032 (Step S8).

Next, the BKM 2032 reads, from the internal information storage unit 6b, the key relay route attribute information regarding the route (route from the BKM 2032 to the BKM 2732) in the QKDN KSD 100-2 that has gone through (Step S3). Next, the BKM 2032 sends, to the BKM 1811, the key relay route attribute information found in Step S6 and the key relay route attribute information read in Step S3, and shares the pieces of key relay route attribute information read in Steps S6 and S3 with the BKM 1811 (Step S9).

The foregoing is the operation before the BKM 1811 belonging to the same domain as the source KM 0001 shares the key relay route attribute information.

Incidentally, in a case where the key relay route attribute information to the destination KM 4666 is not found in Step S6, the processing for searching for the key relay route attribute information is repeated in a further adjacent domain. The search processing is repeatedly continued, for example, if a via-domain value indicating the number of passed domains is within a preset via-domain upper limit value. In the example of FIG. 8, since the passed domain is one, which is the QKDN KSD 100-2, the via-domain value is 1. Specifically, in the example of FIG. 8, in a case where the via-domain upper limit value is 0, the BKM 2032 determines that the destination KM 4666 is unreachable, and notifies the source KM 0001 that the destination KM 4666 is unreachable.

The collection unit 7 of each BKM belonging to the same domain as that of the source KM 0001 stores all the key relay route attribute information regarding the shared route in the external information storage unit 6a. Thereafter, the calculation unit 8 of each BKM reads the key relay route attribute information from the external information storage unit 6a, and calculates metric of a key relay route outside the QKDN KSD 100-1. In addition, the calculation unit 8 of each BKM reads the key relay route attribute information to the source KM 0001 from the internal information storage unit 6b, and calculates metric of a key relay route in the QKDN KSD 100-1.

The determination unit 9 of each BKM determines one key relay route (key relay route with the best metric) from the key relay route candidates on the basis of the state of the key relay route and the metric.

Each BKM notifies the determined optimal route to the source KM 0001. The source KM 0001 uses the most appropriate route among the routes informed by each BKM to share the application key with the destination KM 4666.

Figure 9:
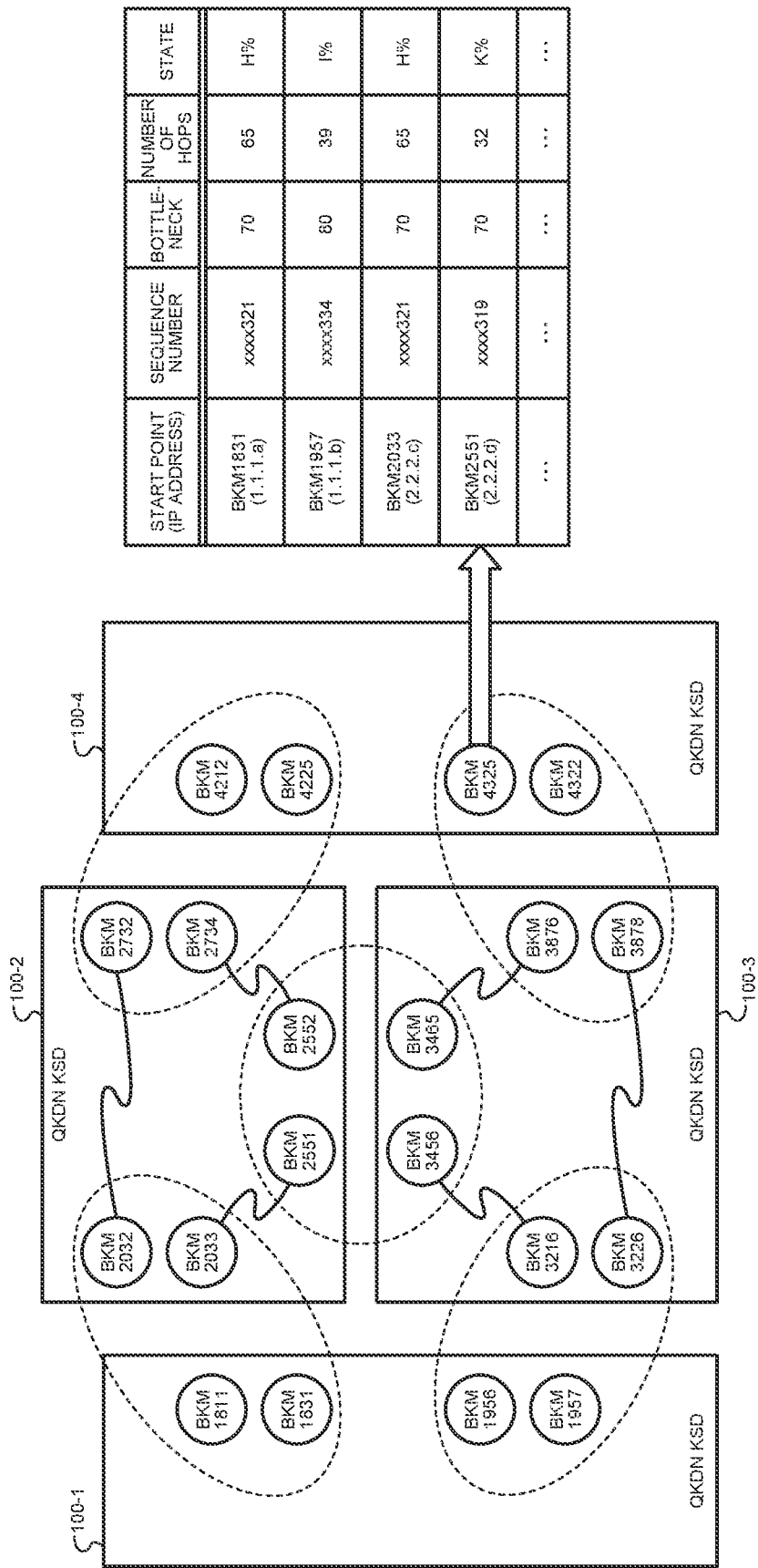
FIG. 9 is a diagram illustrating an example of key relay route attribute information stored in an external information storage unit according to an embodiment.

Example of Key Relay Route Attribute Information Stored in External Information Storage Unit FIG. 9 is a diagram illustrating an example of key relay route attribute information stored in the external information storage unit 6a according to the embodiment. In the example of FIG. 9, the key relay route attribute information stored in the external information storage unit 6a of the BKM 4325 at the boundary of the QKDN KSD 100-4 is described. The key relay route attribute information stored in the external information storage unit 6a is information that is a candidate for the shortest path from each KM (including BKM) outside the domain.

The collection unit 7 collects the key relay route attribute information outside the domain to create a table and stores the table in the external information storage unit 6a. The information collected by the collection unit 7 is the same as that of the case in FIG. 6, and thus the description thereof is omitted.

Note that the key relay route attribute information to BKMs physically located at the same site is consistent with each other. In the example of FIG. 9, the destination BKM 1831 at the first row and the destination BKM 2033 at the third row are physically located at the same site although they belong to different domains, and thus the key relay route attribute information thereof is consistent with each other.

Example of Determination Processing of Key Relay Route

Figure 10:
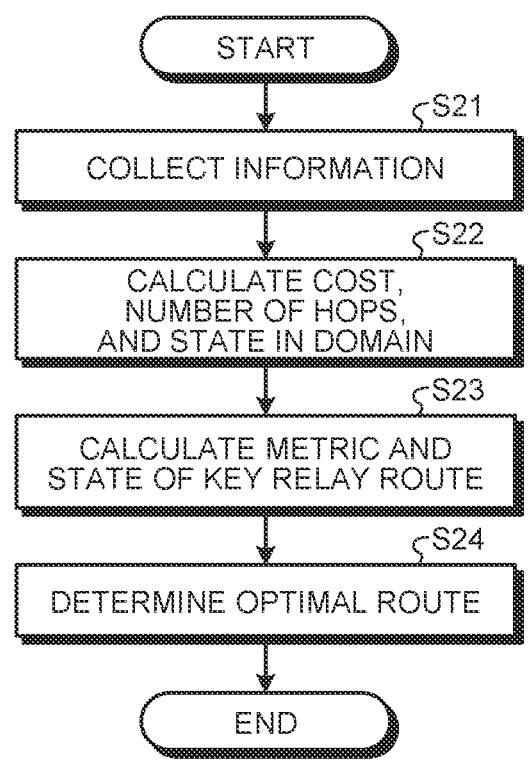
FIG. 10 is a flowchart depicting an example of processing for determining a key relay route according to an embodiment.

FIG. 10 is a flowchart depicting an example of processing for determining a key relay route according to the embodiment. A case where a key relay route from a source KM to a destination KM in a domain different from the source domain is determined is described as an example.

First, the collection unit 7 of a BKM (hereinafter, referred to as a "source BKM") belonging to the same domain as that of the source KM executes the OSPF routing protocol for the intra-domain and the BGP routing protocol for the inter-domain to ascertain the network configuration, and then collects key relay route attribute information from the source KM to the source BKM (Step S21).

The key relay route attribute information collected in Step S21 is expressed by the following formula (1).

$$\{Cost_{link_1}, \ldots, Cost_{link_m}\}, \{QBER_{link_1}, \ldots, QBER_{link_m}\}, KSD_{links} \quad (1)$$

Here, $Cost_{link}$ represents a cost (resource) of each link between the KMs. The resource is a key generation speed and an amount of key held. $QBER_{link}$ represents a QBER (state) of each link between the KMs. $KSD_{links}$ represents a set including m links.

Next, the calculation unit 8 of the source BKM calculates key relay route attribute information (cost, number of hops, and state) in the domain (from the source KM to the source BKM) (Step S22). Specifically, the calculation unit 8 of the source BKM calculates the bottleneck of the cost collected in Step S21 by the following formula (2), calculates the maximum value of the QBER (state) collected in Step S21 by the following formula (3), and calculates the number of hops (total value of the passed links+1) by the following formula (4).

$$Cost_{KSD} = \min_{m \in KSD_{links}}\{Cost_{link_1}, \ldots, Cost_{link_m}\} \quad (2)$$

$$Status_{KSD} = \max_{m \in KSD_{links}}\{QBER_{link_1}, \ldots, QBER_{link_m}\} \quad (3)$$

$$H_{KSD} = \left(\sum_{1}^{KSD_{links}} links\right) + 1 \quad (4)$$

The cost (bottleneck) in the domain (from the source KM to the source BKM) is $Cost_{KSD}$, the state (QBER) is $Status_{KSD}$, and the number of hops is $H_{KSD}$.

Next, the calculation unit 8 of the source BKM calculates metric and a state of the key relay route (Step S23). Specifically, first, the source BKM requests the key relay route attribute information to the destination KM from the BKM of the adjacent domain $KSD_2$. The BKM of the adjacent domain $KSD_2$ sends the cost ($Cost_{KSD2}$), the state ($Status_{KSD2}$), and the number of hops ($H_{KSD2}$) in the adjacent domain $KSD_2$ to the source BKM in a case where the key relay route attribute information to the destination KM is stored in the internal information storage unit 6b.

In a case where the key relay route attribute information to the destination KM is not stored in the internal information storage unit 6b of the BKM of the adjacent domain $KSD_2$, the BKM of the adjacent domain $KSD_2$ continuously requests the key relay route attribute information to the destination KM from a further adjacent domain $KSD_3$. At this time, the key relay route attribute information to the $BKM_2$ in the same site as that of the $BKM_3$ of the adjacent domain needs to be shared to the source BKM.

Next, the calculation unit 8 of the source BKM calculates metric ($M_{path}$) and a state ($Status_{path}$) by combining the key relay route attribute information to the destination KM outside the domain ($KSD_2$ to $KSD_n$) and the key relay route attribute information from the source KM to the source BKM inside the domain ($KSD_1$).

As a calculation example of the metric ($M_{path}$), first, the calculation unit 8 of the source BKM calculates the cost ($Cost_{path}$) of the key relay route by the following formula (5), calculates the number of hops ($H_{path}$) on the key relay route by the following formula (6), and then calculates the metric ($M_{path}$) by the following formula (7).

$$Cost_{path} = \min\{Cost_{KSD_1}, \ldots, Cost_{KSD_n}\} \quad (5)$$

$$H_{path} = \sum_{1}^{N_{KSDs}} H_{KSD} \quad (6)$$

$$M_{path} = Cost_{path} + \mu\frac{1}{H_{path}} \quad (7)$$

Incidentally, μ is a coefficient indicating a weight.

In addition, the state ($Status_{path}$) is calculated by the following formula (8).

$$Status_{path} = \max\{Status_{KSD_1}, \ldots, Status_{KSD_n}\} \quad (8)$$

Incidentally, in a case where there is a plurality of key relay routes $path_1, \ldots, path_j$ from the source KM to the destination KM outside the domain, the external information storage unit 6a of the BKM stores key relay route attribute information regarding all the key relay routes $path_1, \ldots, path_j$.

Finally, the determination unit 9 of the source BKM determines an optimal key relay route from among the plurality of key relay routes $path_1, \ldots, path_j$ from the source KM to the destination KM in response to a request for the source KM to share an application key (Step S24). Specifically, the determination unit 9 of the source BKM determines an optimal key relay route on the basis of the following formulas (9) and (10), for example.

$$R_{route} = \max_{j \in N_{paths}}\{M_{path_1}, \ldots, M_{path_j}\} \quad (9)$$

$$Status_{route} = \max_{j \in N_{paths}}\{Status_{path_1}, \ldots, Status_{path_j}\} \quad (10)$$

The route state value ($Status_{route}$) is a parameter representing route safety, and, if the route has a state value within a threshold, then the route is a candidate for the optimal key relay route.

Note that the processing of Steps S21 and S22 described above is an example, and the collection and calculation of the cost, the number of hops, and the state may be performed by another method. For example, a method is possible in which, for each passed KM, the cost and the state are continuously compared, and the passed KM may convey the minimum value of the cost and the maximum value of the state to the BKM while keeping the minimum value of the cost and the maximum value of the state to the subject KM.

In this case, in the BKM, the minimum value of the cost and the maximum value of the state to the BKM are collected. In addition, the number of hops is an accumulated value of the passed KMs.

Example of Determination of Key Relay Route

Figure 11:
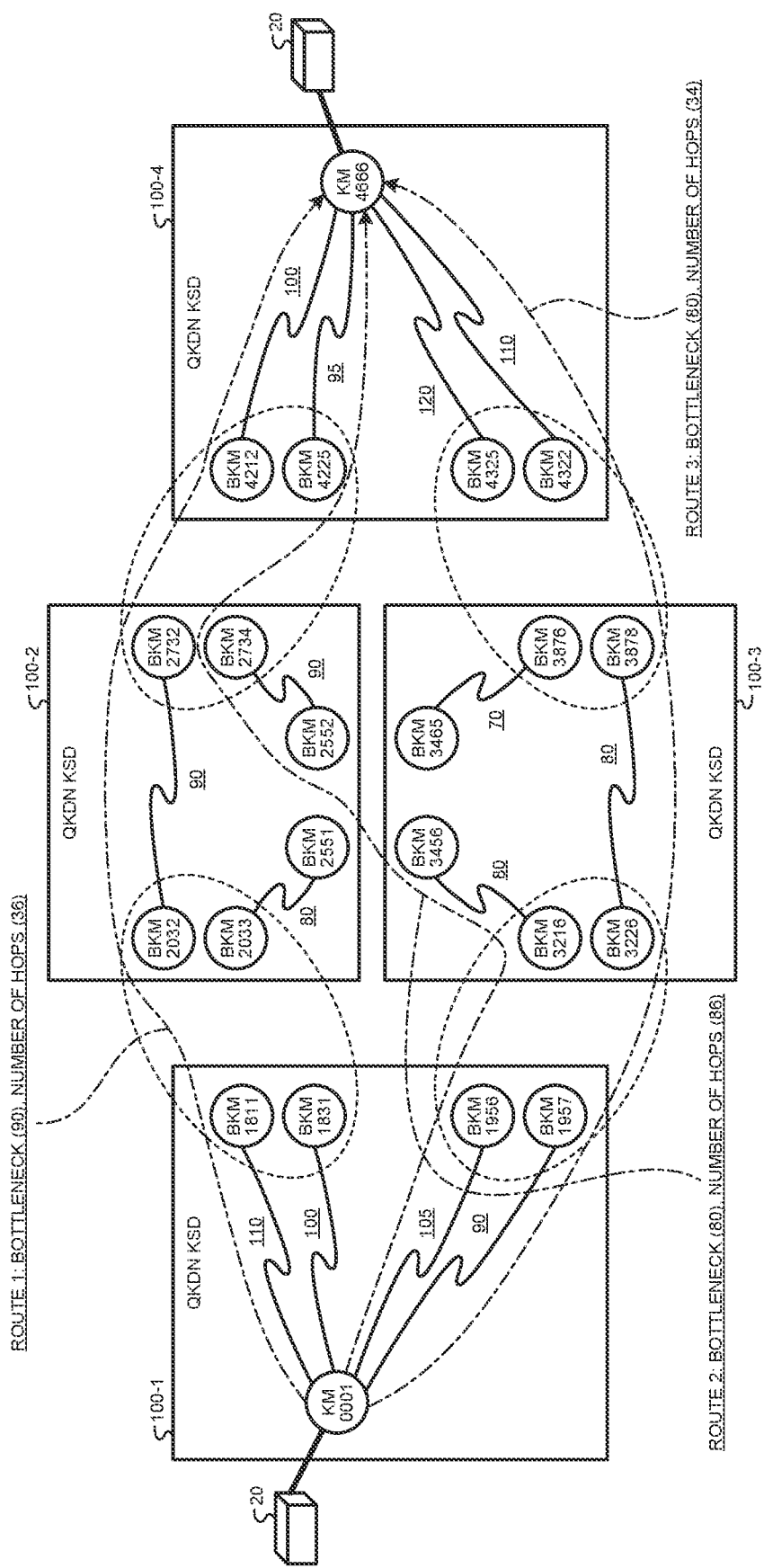
FIG. 11 is a diagram illustrating an example of determining a key relay route according to an embodiment.

FIG. 11 is a diagram illustrating an example of determining a key relay route according to the embodiment. The collection unit 7 of the BKM collects the key relay route attribute information (bottleneck, number of hops, and state value, for example) in a case where a key is shared from the source KM (KM 0001) in the QKDN KSD 100-1 to the destination KM (KM 4666) in the QKDN KSD 100-4 on the right side. Then, the calculation unit 8 of the BKM stores information calculated on the basis of the key relay route attribute information in the external information storage unit 6a of the BKM.

For example, in a case where the key is shared through the QKDN KSD 100-2 to the QKDN KSD 100-4, the bottleneck is 90. In a case where the key is shared through the QKDN KSD 100-3 to the QKDN KSD 100-4, the bottleneck is 80. As illustrated in FIG. 11, in a case where there is a plurality of routes 1 to 3, the determination unit 9 of the BKM determines an optimal route for sharing the key according to a request (definition of metric).

Note that, for example, the resource may fluctuate in response to an increase in the amount of key held due to execution of the quantum key distribution, in response to a decrease in the amount of key held due to transfer of the application key, in response to a change in the key generation speed or the state value due to an influence of an environmental change in the quantum cryptography device. Therefore, when the fluctuation in resource is detected, the collection unit 7 may re-execute the routing protocol including the operation of the present embodiment to calculate again the optimal key relay route. For example, in a case where the communication unit 4 receives a notification that the state value has changed (the state value of the route exceeds the threshold), the determination unit 9 promptly redetermines the optimal route from routes without the change (candidate routes whose state value is within the threshold).

In a case where such a situation is not preferable, the source node sends a key by a source routing method, and a key relay route for sending the key is designated in advance, so that the key relay route determined by the source node can be selected. The source routing is a method in which a key relay route through which data is to pass is determined by the source, and the data is transferred along the key relay route thus determined.

In addition, the route control regarding the present embodiment can be applied to a method other than the method of encrypting the application key with the link key and sharing the resultant.

As described above, the key management device (KM, BKM) according to the embodiment is a key management device that manages an application key for encrypting the communication of the application network 200 including the plurality of applications 20. The key management device includes the collection unit 7, the calculation unit 8, the determination unit 9, and the communication unit 4. The collection unit 7 collects resource information indicating a resource of a link for which a link key is generated by the QKD. The calculation unit 8 calculates metric of a key relay route including the link on the basis of the resource information. The determination unit 9 determines a key relay route from among the plurality of key relay routes on the basis of the metric. The communication unit 4 transmits the application key encrypted with the link key to the destination using the key relay route determined by the determination unit 9.

As a result, according to the key management device (KM, BKM) of the embodiment, it is possible to determine, in a QKD network, an optimal key relay route for sharing the application key. Specifically, according to the key management device (KM, BKM) of the embodiment, for example, even in a QKD network divided into a plurality of domains, it is possible to determine a key relay route for reducing the consumption of the link key as much as possible and efficiently sharing the application key. This makes it possible to reduce the consumption of the link key in the entire system while avoiding the exhaustion of the link key in a specific KM and maintaining the throughput. Further, the collection unit 7 collects the route state information, so that it is possible to efficiently redetermine a route at the anomaly occurrence.

First Modification

The description goes on to the first modification to the embodiment. In the description of the first modification, the description similar to the embodiment is omitted, and portions different from the embodiment is described.

Figure 12:
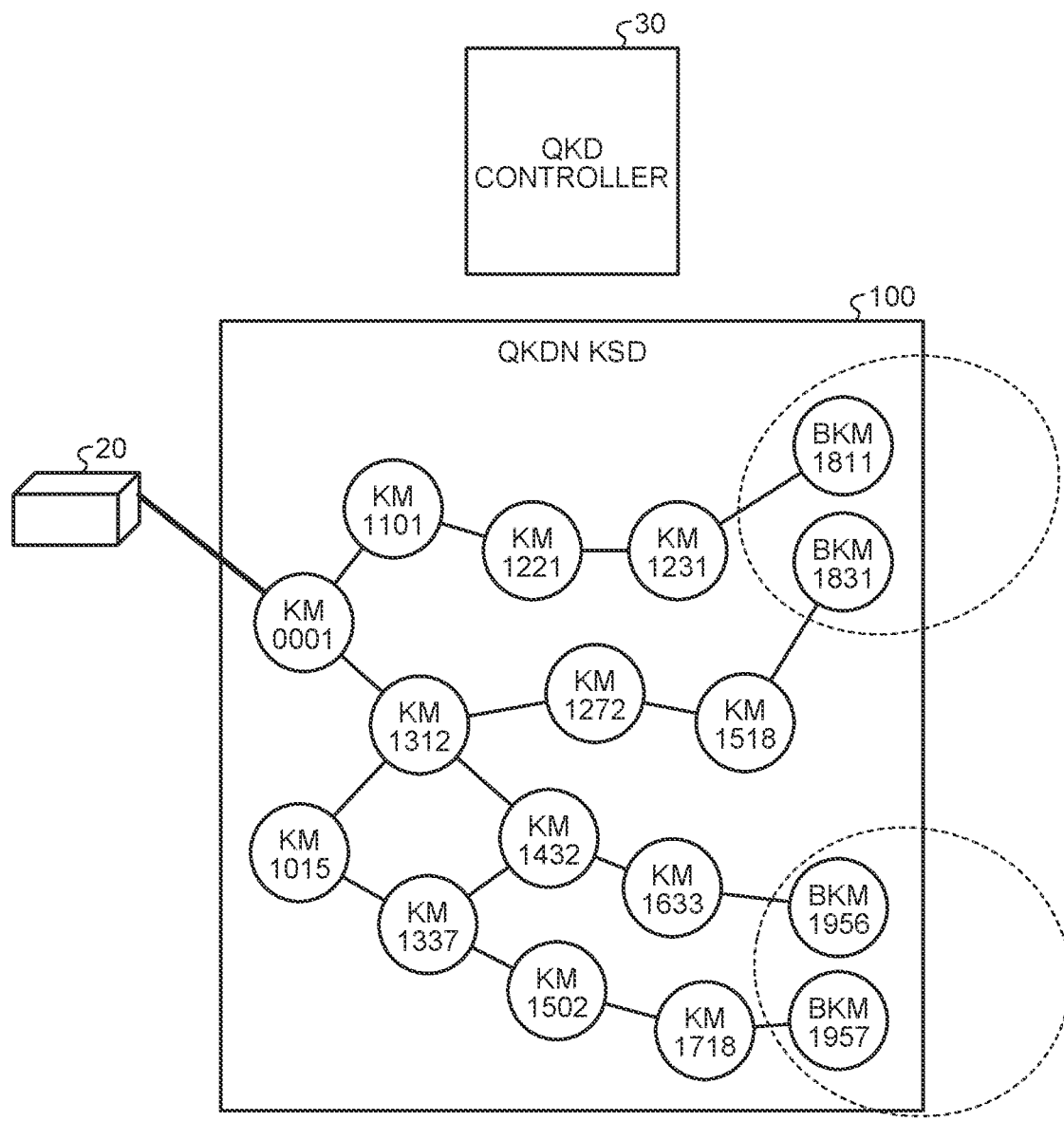
FIG. 12 is an explanatory diagram of a first modification to an embodiment.

FIG. 12 is an explanatory diagram of the first modification to the embodiment. In the first modification, a server device (QKD controller 30) is further provided which centrally manages key relay routes of each domain (QKDN KSD 100).

The QKD controller 30 may designate a key relay route that shares a key with a destination KM. The QKD controller 30 calculates the best key relay route and reflects the calculated key relay route in the key relay route table for each KM (including BKM). This allows each KM to select the best key relay route.

Second Modification

The description goes on to the second modification to the embodiment. In the description of the second modification, the description similar to the embodiment is omitted, and portions different from the embodiment is described.

Figure 13:
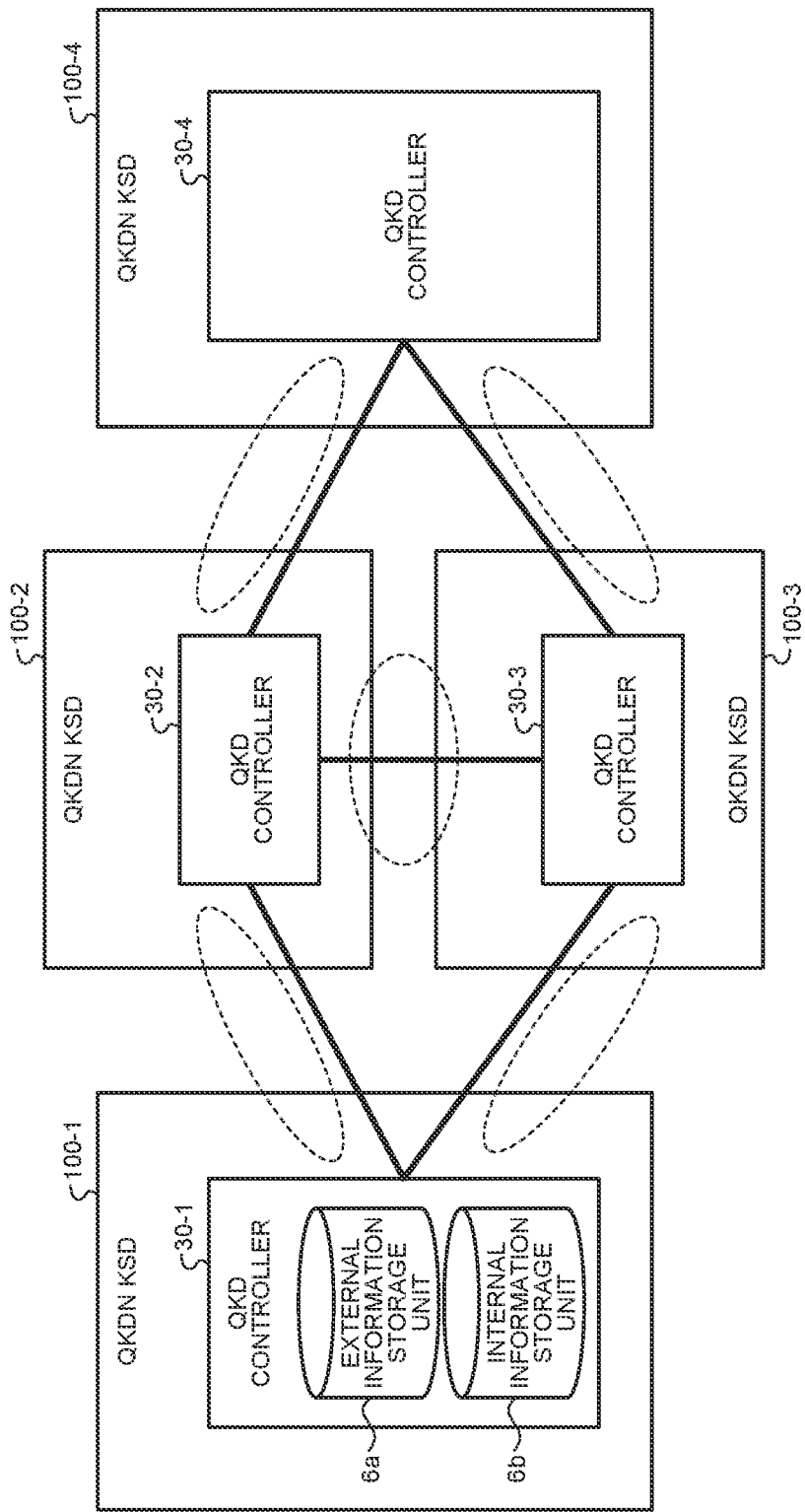
FIG. 13 is an explanatory diagram of a second modification to an embodiment.

FIG. 13 is an explanatory diagram of the second modification to the embodiment. In the second modification, QKD controllers 30-1 to 30-4 are provided for the domains (QKDN KSDs 100-1 to 100-4). The key relay route attribute information is collected between the adjacent QKD controllers 30, and the QKD controller 30 determines an optimal route from the source KM to the destination KM and reflects the optimal route in the key relay route table for the KM (including the BKM).

Similarly to the BKM of the embodiment, it is preferable that, in each QKD controller 30, the internal information storage unit 6b and the external information storage unit 6a are provided separately to manage information. Further, the QKD controllers 30 share information by a method other than the quantum cryptography communication (QKD). The configuration example of the second modification is a centralized to centralized configuration.

Third Modification

The description goes on to the third modification to the embodiment. In the description of the third modification, the description similar to the embodiment is omitted, and portions different from the embodiment is described.

Figure 14:
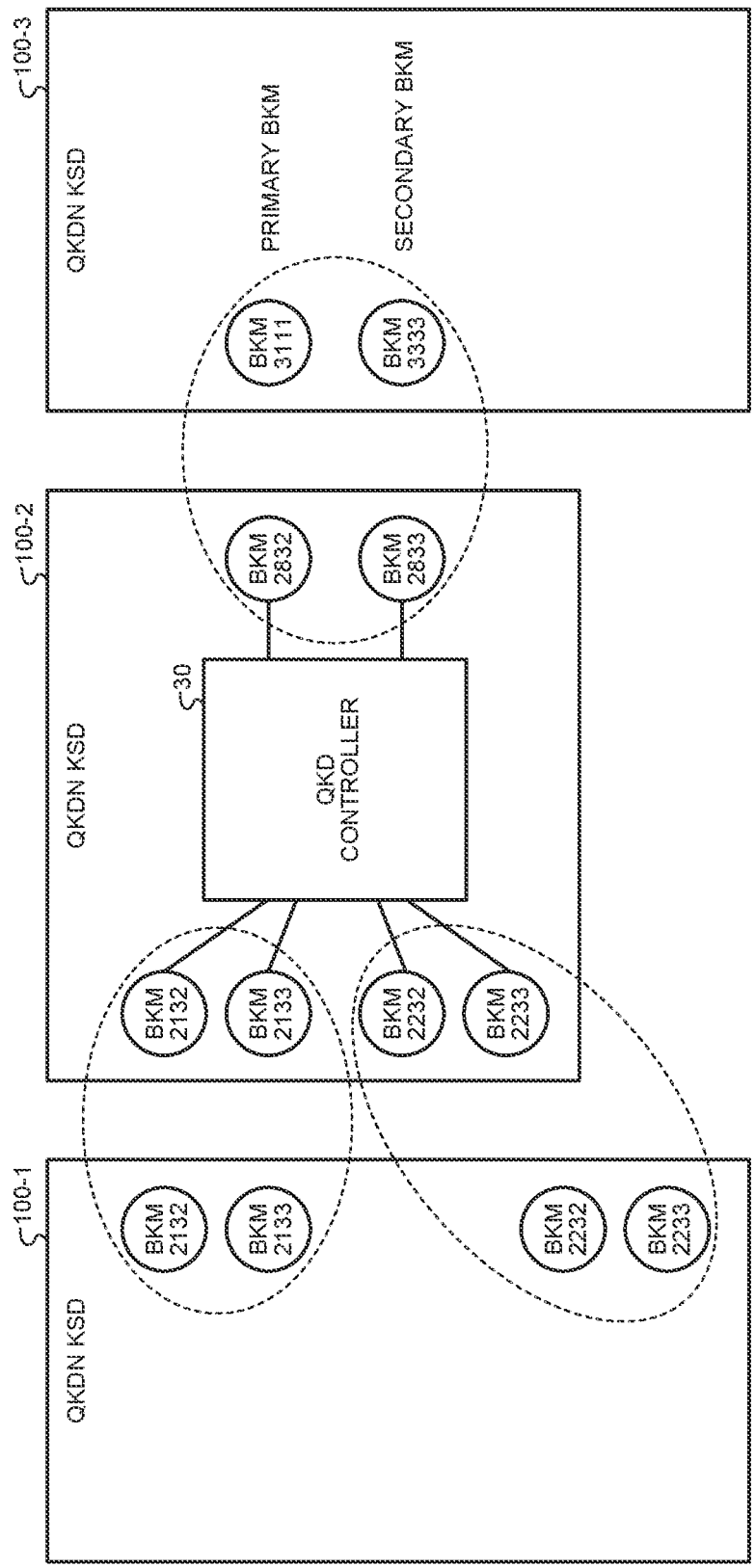
FIG. 14 is an explanatory diagram of a third modification to an embodiment.

FIG. 14 is an explanatory diagram of the third modification to the embodiment. The third modification is an example of a configuration in which a so-called distributed type and a centralized type are mixed. In the third modification, as illustrated on the left side of FIG. 14, the information sharing between the QKD controller 30 and the BKM is performed via the BKM (centralized BKM) of the domain (QKDN KSD 100-2) to which the QKD controller 30 belongs. The centralized BKM does not include a routing protocol function or the like.

Further, from the viewpoint of ease of management and cost saving, as illustrated on the right side of FIG. 14, it is possible to apply, to a distributed type, a design in which the BKM 3111 is set as a primary BKM and a BKM 3333 is set as a secondary BKM that operates, at the anomaly occurrence, in place of the primary BKM (a combination type of a centralized type as the QKD controller 30 and a distributed type as the BKM).

Example of Hardware Configuration

Figure 15:
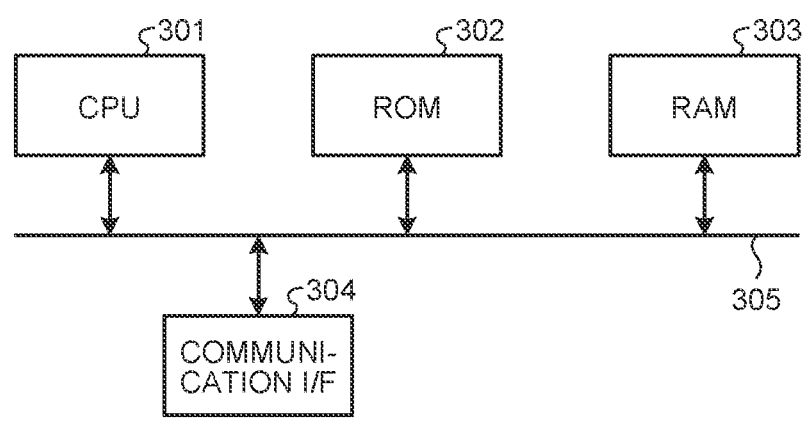
FIG. 15 is a diagram illustrating an example of a hardware configuration of a KM, a BKM, and a QKD controller according to an embodiment.

FIG. 15 is a diagram illustrating an example of a hardware configuration of the KM, the BKM, and the QKD controller 30 according to the embodiment. The KM, the BKM, and the QKD controller 30 of the embodiment include a control device such as a central processing unit (CPU) 301, a storage device such as a read only memory (ROM) 302 and a random access memory (RAM) 303, and a communication I/F 304 that is connected to a network and performs communication. The CPU 301, the ROM 302, the RAM 303, and the network are connected to one another by a bus 305.

For example, a program executed by the KM, the BKM, and the QKD controller 30 according to the present embodiment is provided by being incorporated in the ROM or the like in advance.

Further, for example, the program executed by the KM, the BKM, and the QKD controller 30 according to the present embodiment may be provided as a computer program product by being recorded in a computer-readable recording medium such as a compact disk read only memory (CD-ROM), a flexible disk (FD), a compact disk recordable (CD-R), and a digital versatile disk (DVD) as a file in an installable format or an executable format.

Further, the program executed by the KM, the BKM, and the QKD controller 30 according to the present embodiment may be stored on a computer connected to a network such as the Internet, and provided after being downloaded via the network. Further, the program executed by the KM, the BKM, and the QKD controller 30 according to the present embodiment may be provided or distributed via a network such as the Internet.

The program executed by the KM, the BKM, and the QKD controller 30 according to the present embodiment can cause a computer to function as each unit of the KM, the BKM, and the QKD controller 30 described above. In the computer, the CPU can read a program from a computer-readable storage medium onto a main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key management device managing an application key for encrypting a communication in an application network including a plurality of applications, the key management device comprising:
one or more hardware processors configured to:
collect, using quantum key distribution (QKD), resource information indicating a resource of a link for which a link key is generated;
calculate metric for a key relay route including the link on a basis of the resource information;
determine a key relay route from among a plurality of key relay routes on a basis of the metric; and
use the key relay route determined to send, to a destination, an application key encrypted with the link key,
wherein
the resource information includes at least one of a generation speed for the link key in the link and an amount of the link key held in the link, and
the one or more hardware processors:
calculate first metric based on a bottleneck of resource information on a plurality of links included in the key relay route, the bottleneck being determined based on costs of the plurality of links, the costs each being one of a generation speed for the link key of corresponding one of the plurality of links, an amount of the link key held in the corresponding one of the plurality of links, and a weighted sum of the generation speed for the link key and the amount of the link key; and
determine the key relay route using the first metric as the metric.

2. The key management device according to claim 1, wherein
the one or more hardware processors further calculate a number of hops on the key relay route, and calculates the metric further on a basis of the number of hops.

3. The key management device according to claim 2, wherein
the one or more hardware processors calculate second metric inversely proportional to the number of hops, and
in a case where there is a plurality of the key relay routes having the first metric common to each other, the one or more hardware processors determine a key relay route further on a basis of the second metric.

4. The key management device according to claim 2, wherein
the one or more hardware processors calculate and second metric inversely proportional to the number of hops, and
in a case where there is a plurality of the key relay routes having the second metric common to each other, the one or more hardware processors determine a key relay route further on a basis of the first metric.

5. The key management device according to claim 1, wherein
the one or more hardware processors further collect state information indicating a state of the link,
calculate state information on the key relay route on a basis of state information on a link included in the key relay route, and
determine on a basis of the metric, a key relay route from among key relay routes having state information on the key relay route smaller than a threshold, and determines a key relay route having state information on the key relay route equal to or greater than the threshold as an anomaly route.

6. The key management device according to claim 5, wherein
state information on the link is a quantum bit error rate (QBER) of the link.

7. The key management device according to claim 1, wherein
the key management device belongs to any of a plurality of domains included in a QKD network,
the key management device further comprises:
an internal information memory configured to store therein internal information indicating information on a domain to which the key management device belongs, and
an external information memory configured to store therein external information indicating information on a domain to which the key management device does not belong,
the internal information includes at least the resource information on a link included in the domain to which the key management device belongs, and
the external information includes at least the resource information on a link included in the domain to which the key management device does not belong.

8. The key management device according to claim 7, wherein
the one or more hardware processors collect the resource information stored in the internal information memory of another key management device belonging to the QKD network, and
the external information memory stores therein the resource information stored in the internal information memory of the another key management device.

9. A quantum cryptography communication system including a plurality of key management devices, wherein
the plurality of key management devices manages an application key for encrypting a communication in an application network including a plurality of applications, and
the key management device comprises:
one or more hardware processors configured to:
collect, using quantum key distribution (QKD), resource information indicating a resource of a link for which a link key is generated,
calculate metric for a key relay route including the link on a basis of the resource information,
determine a key relay route from among a plurality of key relay routes on a basis of the metric, and
use the key relay route determined to send, to a destination, an application key encrypted with the link key,
the resource information includes at least one of a generation speed for the link key in the link and an amount of the link key held in the link, and
the one or more hardware processors:
calculate metric based on a bottleneck of resource information on a plurality of links included in the key relay route, the bottleneck being determined based on costs of the plurality of links, the costs each being one of a generation speed for the link key of corresponding one of the plurality of links, an amount of the link key held in the corresponding one of the plurality of links, and a weighted sum of the generation speed for the link key and the amount of the link key; and
determine the key relay route using the first metric as the metric.

10. The quantum cryptography communication system according to claim 9, wherein
the key management device belongs to any of a plurality of domains included in a QKD network,
the one or more hardware processors of the key management device further configured to:
store therein internal information indicating information on a domain to which the key management device belongs, and
store therein external information indicating information on a domain to which the key management device does not belong,
the internal information includes at least the resource information on a link included in the domain to which the key management device belongs, and
the external information includes at least the resource information on a link included in the domain to which the key management device does not belong.

11. A computer program product comprising a non-transitory computer-readable medium including programmed instructions stored therein, the instructions causing a computer for managing an application key for encrypting a communication in an application network including a plurality of applications, to as:
collect, using quantum key distribution (QKD), resource information indicating a resource of a link for which a link key is generated;
calculate metric for a key relay route including the link on a basis of the resource information;
determine a key relay route from among a plurality of key relay routes on a basis of the metric; and
use the key relay route determined to send, to a destination, an application key encrypted with the link key,
the resource information includes at least one of a generation speed for the link key in the link and an amount of the link key held in the link, and
the instructions cause the computer to:
calculate metric based on a bottleneck of resource information on a plurality of links included in the key relay route, the bottleneck being determined based on costs of the plurality of links, the costs each being one of a generation speed for the link key of corresponding one of the plurality of links, an amount of the link key held in the corresponding one of the plurality of links, and a weighted sum of the generation speed for the link key and the amount of the link key; and
determine the key relay route using the first metric as the metric.

12. A key management method for managing an application key for encrypting a communication in an application network including a plurality of applications, the method comprising:
collecting, using quantum key distribution (QKD), resource information indicating a resource of a link for which a link key is generated;
calculating metric for a key relay route including the link on a basis of the resource information;
determining a key relay route from among a plurality of key relay routes on a basis of the metric; and
using the key relay route determined to send, to a destination, an application key encrypted with the link key, wherein
- the resource information includes at least one of a generation speed for the link key in the link and an amount of the link key held in the link, and
- first metric is calculated based on a bottleneck of resource information on a plurality of links included in the key relay route, the bottleneck being determined based on costs of the plurality of links, the costs each being one of a generation speed for the link key of corresponding one of the plurality of links, an amount of the link key held in the corresponding one of the plurality of links, and a weighted sum of the generation speed for the link key and the amount of the link key; and
- the key relay route is determined using the first metric as the metric.

* * * * *

UNITED STATES PATENT AND TRADEMARK OFFICE
CERTIFICATE OF CORRECTION

PATENT NO. : 12,231,553 B2  
APPLICATION NO. : 17/898902  
DATED : February 18, 2025  
INVENTOR(S) : Yu et al.

Page 1 of 1

It is certified that error appears in the above-identified patent and that said Letters Patent is hereby corrected as shown below:

In the Claims

• Claim 2, Column 22, Line 37, "calculates" should read as —calculate—.

• Claim 4, Column 22, Line 50, "calculate and second" should read as —calculate the second—.

• Claim 5, Column 22, Line 67, "determines" should read as —determine—.

• Claim 11, Column 24, Line 27, "to as:" should read as —to:—.

Signed and Sealed this  
Twenty-fourth Day of June, 2025

Coke Morgan Stewart  
*Acting Director of the United States Patent and Trademark Office*